(12) United States Patent
Theimer et al.

(10) Patent No.: US 10,983,830 B2
(45) Date of Patent: Apr. 20, 2021

(54) PARAMETER VARIATIONS FOR COMPUTATIONS USING A REMOTE REPOSITORY

(71) Applicant: Amazon Technologies, Inc., Seattle, WA (US)

(72) Inventors: Marvin Michael Theimer, Seattle, WA (US); Julien Jacques Ellie, Fall City, WA (US); Colin Watson, Seattle, WA (US); Ullas Sankhla, Seattle, WA (US); Swapandeep Singh, Seattle, WA (US); Kerry Hart, Seattle, WA (US); Paul Anderson, Seattle, WA (US); Brian Dahmen, Bainbridge Island, WA (US); Suchi Nandini, Seattle, WA (US); Yunhan Chen, Kirkland, WA (US); Shu Liu, Mercer Island, WA (US); Arjun Raman, Seattle, WA (US); Yuxin Xie, Seattle, WA (US); Fengjia Xiong, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 123 days.

(21) Appl. No.: 16/147,474

(22) Filed: Sep. 28, 2018

(65) Prior Publication Data
US 2020/0104175 A1 Apr. 2, 2020

(51) Int. Cl.
*G06F 9/50* (2006.01)
*G06N 20/00* (2019.01)
*G06F 8/60* (2018.01)

(52) U.S. Cl.
CPC .......... *G06F 9/5027* (2013.01); *G06N 20/00* (2019.01); *G06F 8/60* (2013.01)

(58) Field of Classification Search
CPC ... G06F 9/50–5094; G06F 8/70; G06F 16/183
(Continued)

(56) References Cited

U.S. PATENT DOCUMENTS

| | | | | |
|---|---|---|---|---|
| 7,765,549 B1 * | 7/2010 | Lauer | .................... | G06F 9/5005 707/705 |
| 7,821,662 B2 * | 10/2010 | Matsueda | ............. | G06F 3/1217 358/1.13 |

(Continued)

OTHER PUBLICATIONS

Arulswamy, J. et al., Columbus: Enabling Scalable Scientific Workflows for Fast Evolving Spatio-Temporal Sensor Data; IEEE International Conference on Services Computing (SCC), Jun. 25-30, 2017, pp. 9-18, [retrieved on Dec. 9, 2020], Retrieved from the Internet: <URL:http://ieeexplore.ieee.org/>.*

(Continued)

*Primary Examiner* — Geoffrey R St Leger
(74) *Attorney, Agent, or Firm* — Robert C. Kowert; Kowert, Hood, Munyon, Rankin & Goetzel, P.C.

(57) ABSTRACT

Methods, systems, and computer-readable media for parameter variations for computations using a remote repository are disclosed. A first computation is assigned to a first set of one or more hosts. The first computation is associated with first parameters including one or more inputs and program code. A second computation is assigned to a second set of one or more hosts and is associated with a second set of parameters. Execution of the first computation is initiated using the first set of hosts and the first set of parameters. Local copies of the input(s) and program code are obtained from a storage service using a TO credential supplied by a repository manager. Execution of the second computation is initiated using the second set of hosts and the second set of parameters as obtained using a credential supplied by the repository manager.

25 Claims, 22 Drawing Sheets

(58) Field of Classification Search
USPC .................................................. 718/104, 105
See application file for complete search history.

(56) References Cited

U.S. PATENT DOCUMENTS

| | | | | |
|---|---|---|---|---|
| 8,042,151 | B2* | 10/2011 | Olsen | G06F 21/6218 726/2 |
| 9,251,114 | B1 | 2/2016 | Ancin et al. | |
| 9,426,140 | B2 | 8/2016 | Palmeri et al. | |
| 9,880,837 | B2 | 1/2018 | Khazanchi et al. | |
| 10,037,230 | B2* | 7/2018 | Chen | G06F 9/5038 |
| 2007/0133047 | A1* | 6/2007 | Matsueda | G06F 3/1259 358/1.15 |
| 2013/0253977 | A1* | 9/2013 | Vibhor | G06F 11/1464 705/7.26 |
| 2018/0032373 | A1* | 2/2018 | Chen | G06F 9/5038 |
| 2019/0317825 | A1* | 10/2019 | O'Neal | H04F 43/0876 |
| 2020/0065155 | A1* | 2/2020 | Tummuru | G06F 9/5072 |

OTHER PUBLICATIONS

Narang, A., et al., Performance Driven Multi-Objective Distributed Scheduling for Parallel Computations, ACM SIGOPS Operating Systems Review, Jul. 2011, pp. 14-27, [retrieved on Dec. 9, 2020], Retrieved from the Internet: <URL:http://dl.acm.org/>.*

Nunes, R., et al., Big-data Transportation in Orchestrated Bioinformatics Workflows, Proceedings of the Second International Conference on Information and Communication Technology for Competitive Strategies, Mar. 2016, 7 pages, [retrieved on Dec. 9, 2020], Retrieved from the Internet: <URL:http://dl.acm.org/>.*

Saeed Noursalehi, "Announcing GVFS (Git Virtual File System)," Microsoft DevOps Blog, Microsoft.com, Feb. 2017. Source: https://blogs.msdn.microsoft.com/devops/2017/02/03/announcing-gvfs-git-virtual-file-system/, pp. 1-3.

Saeed Noursalehi, "Git at Scale," Microsoft.com, Feb. 2018, Source: https://docs.microsoft.com/en-us/azure/devops/learn/git/git-at-scale, pp. 1-3.

Saeed Noursalehi, "Git Virtual File System Architecture," Microsoft.com, Oct. 2017, Source: https://docs.microsoft.com/en-us/azure/devops/learn/git/gvfs-architecture, pp. 1-8.

Saeed Noursalehi, "Limited Refs," Microsoft.com, Feb. 2018, Source: https://docs.microsoft.com/en-us/azure/devops/learn/git/limited-refs, pp. 1-6.

Saeed Noursalehi, "Technical Scale Challenges with Git," Microsoft.com, Oct. 2017, Source: https://docs.microsoft.com/en-us/azure/devops/learn/git/technical-scale-challenges, pp. 1-4.

Saeed Noursalehi, "The Race to Push," Microsoft.com, Oct. 2017, Source: https://docs.microsoft.com/en-us/azure/devops/learn/git/race-to-push, pp. 1-7.

"Android Open Source Project: Overview," Jun. 2018, Source: https://source.android.com/setup/develop, pp. 1-7.

"Android Open Source Project: Repo Command Reference," Mar. 2018, Source: https://source.android.com/setup/develop/repo, pp. 1-7.

U.S. Appl. No. 16/147,468, filed Sep. 28, 2018, Marvin Michael Theimer.

U.S. Appl. No. 16/147,471, filed Sep. 28, 2018, Marvin Michael Theimer.

Christian Hoffman, et al., "Towards an architecture for end-to-end-encrypted file synchronization systems", IEEE, 2015 IEEE 24th International Conference on Enabling Technologies: Infrastructure for Collaborative Enterprises, Jun. 15, 2015, pp. 170-175.

Hendrik Graupner, et al, "Secure Access Control for Multi-Cloud Resources", IEEE, 40th Annual IEEE Conference on Local Computer Networks, LCN 2015, pp. 722-729.

Maryam Eslami Chalandar, et al., "A Centralized Cookie-Base Single Sign-On in Distributed Systems", Information and Communications Technology, Dec. 16, 2007, ITI 5th International Conference on, pp. 163-165.

Uichin Lee, et al., "Secure Personal Content Networking over Untrusted Devices", ARXIV.org, Cornell University Library, Jun. 1, 2015, pp. 1-15.

* cited by examiner

PARAMETER VARIATIONS FOR COMPUTATIONS USING A REMOTE REPOSITORY

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

Figure 1:
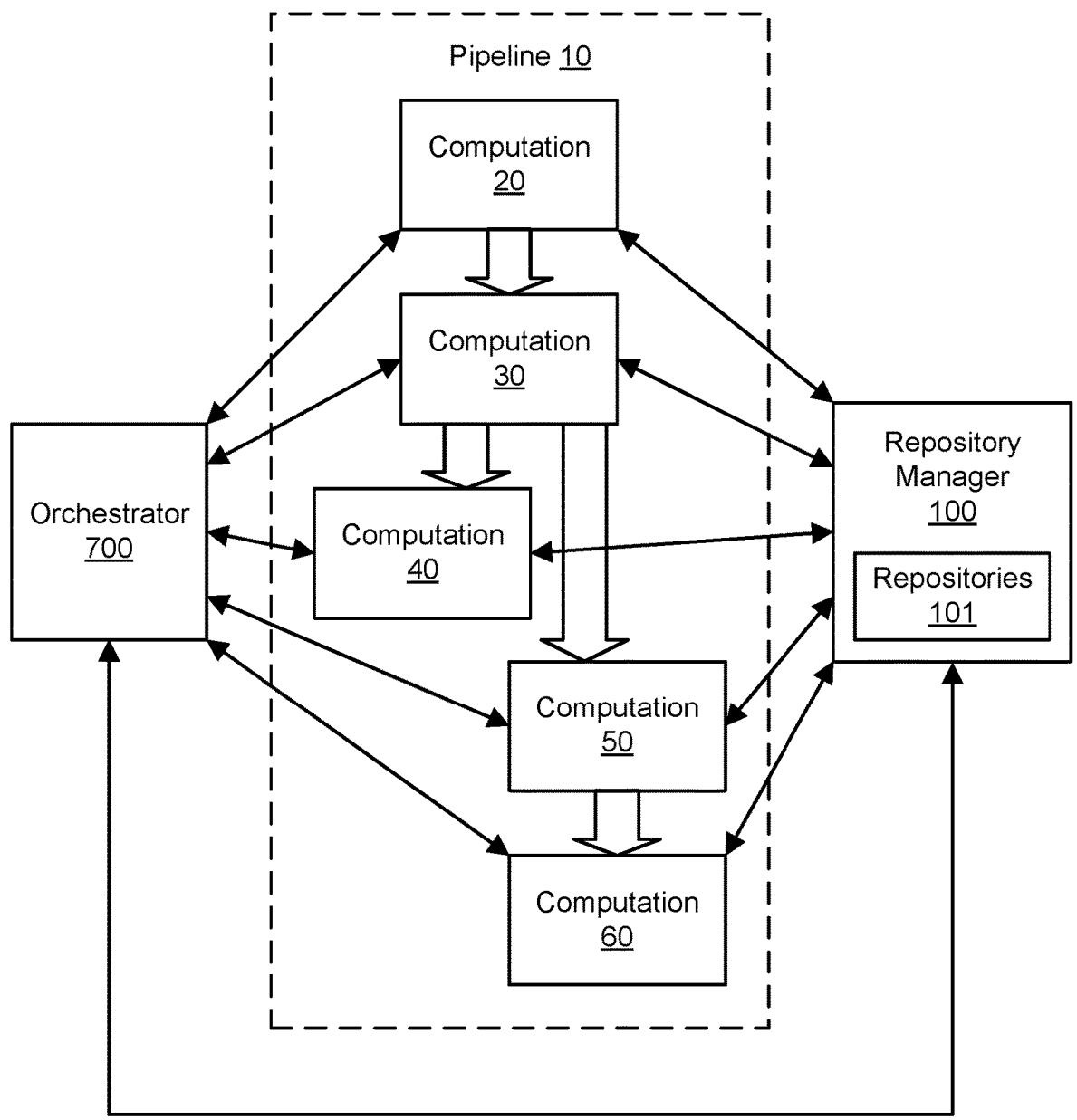
FIG. 1 illustrates an example of a remote repository that is accessible by numerous computations in a pipeline, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for a client-side filesystem for a remote repository are described. In one embodiment, a repository manager is accessible by multiple clients to add data items to a repository or to obtain copies of data items for local use. The repository manager may manage access to multiple repositories, and each repository may include one or more references to a "commit" that represents a version of a tree structure with directories and files. Files may be content-addressable using content hashes of the files. A repository may be immutable such that data may be added to the repository but not subtracted. A repository may record the lineage of data. At a client device, local copies of all or part of the files and metadata for a repository may be obtained and stored locally in a cache. The directories and files may be accessed on the client via a local filesystem. New files (including modified files) associated with the repository may be generated and stored in the cache. In one embodiment, the new files may be stored separately from original (unmodified) files obtained from the repository manager. When the client commits the current version of the repository to the repository manager, the client may detect and send only the new files (and metadata) and not the unmodified files (and metadata). The repository manager may then add the new files to the repository without needing to analyze the entire repository to determine which data is new. To further improve the scalability and performance of the repository manager, a repository manager service may provide the client with access credentials for files in a storage service, and the client may access the storage service directly to obtain or upload files of a repository. To improve network usage, access credentials may be cached at the client and reused multiple times during a single session. To improve network usage, small files (e.g., metadata files) may be aggregated into batches. To improve network usage, only a portion of a repository (and metadata) may be loaded into the local cache at a client.

Various embodiments of methods, systems, and computer-readable media for orchestration of computations using a remote repository are described. In one embodiment, a computation orchestrator manages computations across a fleet of hosts. The orchestrator may record the inputs to a computation, the program code for a computation, and the outputs of a computation using a remote repository manager. In one embodiment, the repository manager is accessible by multiple clients, including the hosts, to add data items to a repository or to obtain copies of data items and program code for local use. At a host, local copies of directories and files may be obtained from the repository manager and accessed on the host via a local filesystem. The program code for a computation may be implemented using a container and may also be obtained by a host from the repository manager. A computation may be replayed by obtaining the archival recordings of the inputs and program code from the repository manager. The orchestrator may select hosts for a particular computation according to the capabilities of the hosts and the needs of the computation. A computation may represent a step in a workflow, and different steps may be assigned to different hosts running concurrently or serially. A workflow may be configured to perform a computation for many entities (e.g., accounts, primary keys, etc.), and those entities may be divided into subsets by the orchestrator and assigned to different hosts. The orchestrator may scale the number of concurrently used hosts up or down, e.g., based on the number of entities associated with the computation. The orchestrator may perform per-entity exception handling such that the computation for some entities in a batch may continue even after the computation has failed for other entities in the batch. The orchestrator may maintain a mapping of entities to hosts and may assign computations to hosts based on the mapping, e.g., such that cached data is re-used at a host from one computation to another computation. Computation requests for particular entities may be buffered or queued by the orchestrator and then batched into a single workflow step. Using these techniques, computations and workflows may be orchestrated to make efficient use of computational resources, memory resources, and network resources while permitting archiving, replay, and auditing.

Various embodiments of methods, systems, and computer-readable media for parameter variations for computations using a remote repository are described. In one embodiment, a computation orchestrator manages computations across a fleet of hosts. The orchestrator may record the inputs to a computation, the program code for a computation, and the outputs of a computation using a remote repository manager. In one embodiment, the repository manager is accessible by multiple clients, including the hosts, to add data items to a repository or to obtain copies of data items and program code for local use. At a host, local copies of directories and files may be obtained from the repository manager and accessed on the host via a local filesystem. The program code for a computation may be implemented using a container and may also be obtained by a host from the repository manager. In one embodiment, the orchestrator may manage computations having some similarities but also having parameter variations. For example, the orchestrator may manage a first computation using one set of inputs and a second computation using the same program code but a different set of inputs. As another example, the orchestrator may manage a first computation using one set of program code and a second computation using the same inputs but a different set of program code. The parameter variations may be run concurrently or serially. The orchestrator may determine outcomes of the computations and may permit selection of one set of parameters based on those outcomes. The orchestrator may vary a set of parameters for a computation based on the outcome of a prior computation having a particular set of parameters. Using parameter variations, the orchestrator may perform AB testing of software to select an optimal build. Using parameter variations, the orchestrator may perform "what if" simulations with different inputs, e.g., different usage patterns or different pricing plans for determining bills for a customer of a multi-tenant provider network. Using parameter variations, the orchestrator may test a software build with different sets of input data in a parallel manner. Parameter variations may permit the orchestrator to run simulations, machine learning tasks, financial analysis tasks, and so on.

As one skilled in the art will appreciate in light of this disclosure, embodiments may be capable of achieving certain technical advantages, including some or all of the following: (1) improved scalability for a repository manager service by permitting clients to access a data store (using credentials supplied by the service) rather than accessing the service itself to read or write data; (2) improved use of network bandwidth by aggregating small files into batches sent over the network; (3) improved use of network bandwidth by caching and reusing access credentials for data obtained over the network; (4) improved use of network bandwidth by loading only the required files and metadata of a repository at a client device; (5) improved auditability of data in a repository by enforcing data immutability and by recording the lineage of data; (6) reduced use of memory resources using deduplication permitted by centralized data storage; (7) improved use of computational and network resources by keeping track of new files on the client side and only sending the new files to the remote repository; (8) improved use of computational resources by orchestration of computations assigned to resources having particular characteristics; (9) improved use of memory and network resources by cache-aware orchestration of hosts such that cached data at a host is reused from computation to computation; (10); improved use of computational resources by micro-batching of entities (11); improved use of computational resources by entity-specific exception handling; (12) improved speed and accuracy of software testing by orchestration of computations with parameter variations; (13) improved use of computational resources by orchestration of machine learning computations with parameter variations; (14) improved use of computational resources by orchestration of scientific computations with parameter variations; and so on.

Client-Side Filesystem for a Remote Repository

FIG. 1 illustrates an example of a remote repository that is accessible by numerous computations in a pipeline, according to some embodiments. A repository manager 100 may provide access to repositories of data 101. The repository manager 100 may act as a centralized broker of data for numerous entities throughout an enterprise. For example, as shown in FIG. 1, a pipeline may include various steps, stages, or components such as computations 20, 30, 40, 50, and 60. The computations 20-60 may represent or be performed by clients of the repository manager 100. In one embodiment, the computations 20-60 may be owned or managed by different entities within an enterprise, such as different divisions of teams within an organization. In one embodiment, any of the computations 20-60 may interact with the repository manager 100 to obtain data from one or more of the repositories 101. In one embodiment, any of the computations 20-60 may then generate output data based (at least in part) on input data obtained from the repository manager 100. In one embodiment, any of the computations 20-60 may interact with the repository manager 100 to add the output data to one or more of the repositories 101. In one embodiment, any of the computations 20-60 may be invoked and/or managed by an orchestrator 700. In one embodiment, any of the computations 20-60 may be performed without use of the orchestrator 700. By centralizing access to repositories 101 in this manner, the organization may reduce duplication of data while offering auditability, immutability, reusability, and historical availability. The repository manager 100 and associated client-side components may offer a unified interface for clients to read from and write to repositories 101. Using the repository manager 100, data may be monitored, tracked, and audited as it moves through a pipeline 10 of an organization.

Figure 2:
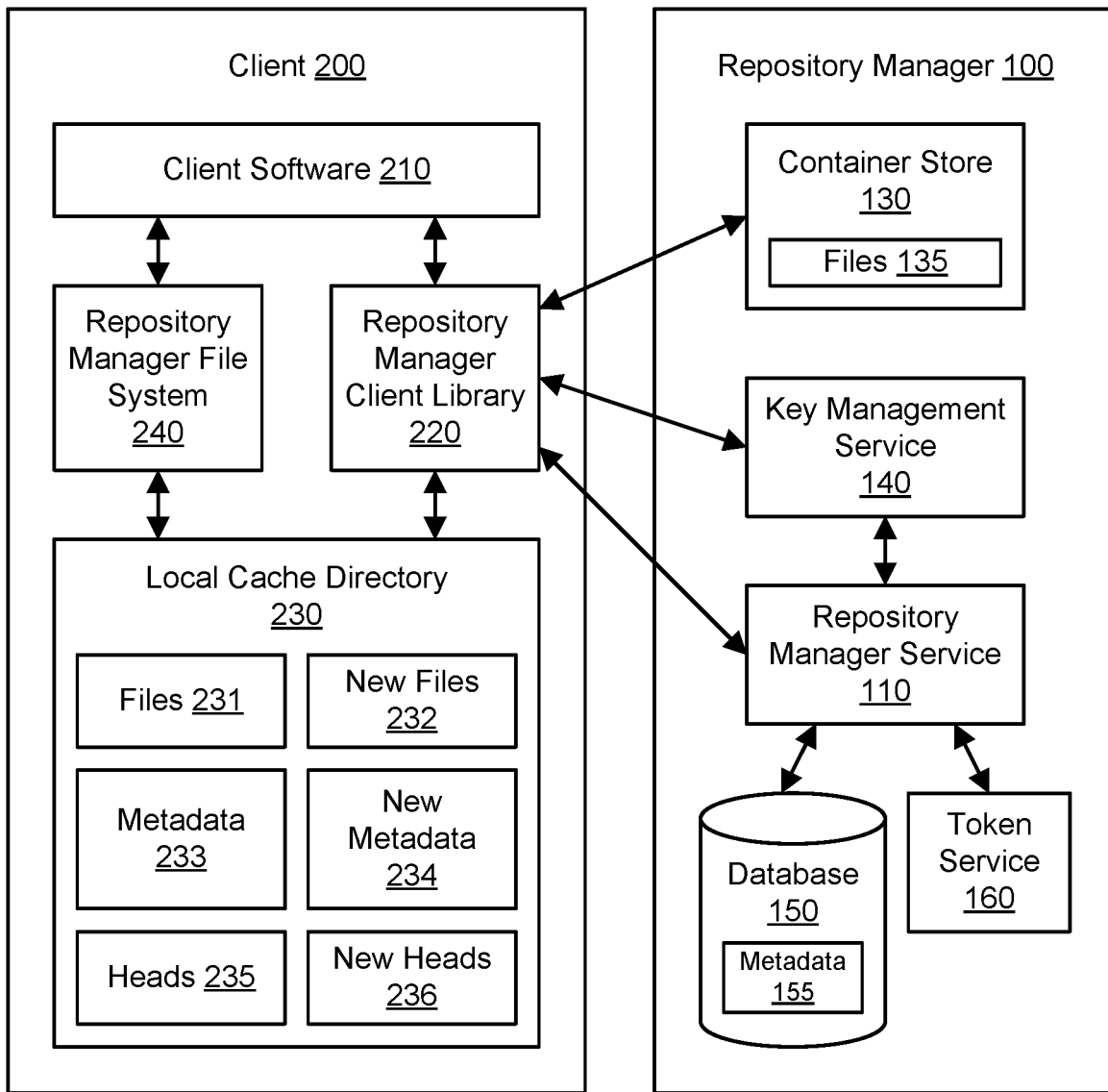
FIG. 2 illustrates an example system environment for a client-side filesystem for a remote repository, according to some embodiments.

FIG. 2 illustrates an example system environment for a client-side filesystem for a remote repository, according to some embodiments. The repository manager 100 may be used by a plurality of clients, such as client 200, to access files 135 associated with one or more repositories. The files 135 may also be referred to as data objects or items. The repository manager 100 may represent a remote set of components, and the client 200 may represent a local set of components. In various embodiments, the repository manager 100 and its client-side components may be responsible for providing a client 200 with a local representation of remote repository contents, tracking the modifications of the contents, and uploading modified data back into the remote storage. The repository manager 100 may include a repository manager service 110 that brokers remote data and metadata. The repository manager 100 may be associated with a repository manager client library 220 on the client 200 that provides an interface between the client 200 and the remote components of the repository manager 100, e.g., to copy data from the repository manager 100 into a local cache directory 230 at the client 200. The repository manager 100 may also be associated with a repository manager filesystem 240 on the client 200 that reads from the cache 230 and writes updates to the cache.

The repository manager service 110 may offer various application programming interfaces (APIs) or other programmatic interfaces that permit other entities to request the service 110 to perform various functions. In one embodiment, the repository manager service 110 is responsible for storing and vending the various items of metadata 155 (e.g., commits, trees, tree indices, namespace policies, and so on) associated with a customer, e.g., using a storage service that offers a database 150. Commits, trees, tree indices, and namespaces are discussed in greater detail with respect to FIG. 3. In one embodiment, the repository manager service 110 is also responsible for vending access to a storage service that maintains a container store 130. A storage service used by the repository manager 100 may represent a distinct and separate service from the repository manager service 110 and may present one or more APIs to clients of the storage service. A storage service used by the repository manager 100 may use any suitable storage techniques, including block-based storage, file-based storage, or database storage in order to maintain data objects on behalf of clients. In one embodiment, the container store 130 may store files 135 in one or more storage locations termed "buckets" that are owned by the repository manager 100. In one embodiment, the portion of the container store 130 used by the repository manager 100 may represent one bucket that is "owned" by the repository manager. The files 135 may be isolated by namespace. In one embodiment, access to the container store 130 may be given out via a temporary access token from a token service 160. In one embodiment, the container store 130 may be accessed using a pre-signed uniform resource locator (URL) vended by the repository manager 100. In one embodiment, the repository manager service 110 provides clients the ability to read from and write to the store 130 directly (after being granted a credential by the service 110) and without needing to go through the service 110 for every read or write.

Files written to the container store 130 may be encrypted client-side by a namespace-isolated data key. The data key may be vended out via a key management service 140. Using the key management service 140, an account can create a Customer Master Key (CMK). In one embodiment, a CMK may have a small limit to the amount of data that can be encrypted (as the CMK never leaves the key management service 140), and as such it is usually used to encrypt additional "data keys" that themselves encrypt larger pieces of data outside the service. The repository manager 100 may leverage this capability by owning Customer Master Keys for each namespace. When a namespace is created, the repository manager service 110 may create and store a CMK associated with the namespace. When a client 200 later requests access to the container store 130 (e.g., via a "GetContainerStoreAccess" API), the service 110 may vend the resource identifier of the CMK associated with the client's namespace. In one embodiment, this CMK gives the client 200 the ability to later call the key management service 140 on their own to request a data key to use to encrypt their files locally before they are uploaded to the container store 130.

On the local or client side, the client software 210 may represent client-specific program code or logic. The client software 210 may be configured to perform tasks in a variety of domains using files 135 vended by the repository manager 100, such as machine learning, scientific calculations, simulations, financial analysis, generation of billing records based on usage records and pricing models, and so on. The client software 210 may interact with the filesystem 240 using standard file input/output operations. The filesystem 240 may read from and write to the local cache directory 230. As will be described below with respect to FIGS. 4A, 4B, 4C, and 4D, the client software 210 may cause the cache 230 to be initialized and may mount the filesystem 240. The client software 210 may be used to generate new files which are then written to the cache 230. As will be described below with respect to FIGS. 5A, 5B, 5C, and 5D, the client software 210 may push new (or modified) data to the repository manager 100 and unmount the filesystem 240. In some embodiments, clients may access repositories without using the local filesystem 240. For example, a client may use a repository manager API to directly read files from a repository, perform operations using those files, and use client-side change journaling to determine any new or modified files to be added back to the repository.

In one embodiment, the repository manager service 110 may offer an API called GetContainerStoreAccess that accepts as input the repository, ref, or namespace to be accessed and provides as output the temporary key used for authorized access to the container store 130, the session token used for authorization with the container store, and an encryption key resource identifier associated with the namespace. In one embodiment, the repository manager service 110 may offer an API called GetRef that accepts as input the ref of a repository and provides as output the commit ID of the current head of the ref. In one embodiment, the repository manager service 110 may offer an API called PutRef that accepts as input the ref of a repository, the current remote commit ID, and a new commit ID and provides as output the success or failure of the write (where failure may occur if the supplied commit ID has changed in the repository). In one embodiment, the repository manager service 110 may offer an API called BatchGetRawObject that accepts as input a list of hashes of content to be returned (e.g., commits, trees, or tree indices) and the namespace to which the data belongs and provides as output the requested metadata content. In one embodiment, the repository manager service 110 may offer an API called BatchPutRawObject that accepts as input a list of hashes and data content to be uploaded (e.g., commits, trees, or tree indices) and the namespace to which the data belongs and provides as output the success or failure of the write. In one embodiment, the repository manager service 110 may offer an API called GetNamespacePolicy that accepts as input a namespace and provides as output the corresponding namespace policy. In one embodiment, the repository manager service 110 may offer an API called PutNamespacePolicy that accepts as input a namespace and a namespace policy and provides as output the success or failure of the write.

In one embodiment, the local cache directory 230 may be used for storage of repository-related data. The cache directory 230 may be scoped to a namespace such that only data within a particular namespace is stored together. The hierarchical structure of the cache 230 may not represent the repository that it represents but may instead be a resource that is used for local representation of repository data to the filesystem 240. The cache 230 may be used for local (client-side) deduplication of repository data and metadata. In one embodiment, the cache 230 may isolate and differentiate data that is already represented remotely by the repository manager 100 from data that has been staged for upload but is not yet present remotely. This isolation may be enforced by the filesystem 240. Using this isolation, the client 200 may be responsible for tracking changes to files 135, thus freeing the repository manager 100 of the responsibility and yielding enhanced scalability for the remote components shown in FIG. 2. By using the client 200 to determine which files in a repository are new (including modified versions of existing files), the repository manager 100 may avoid a complex and resource-intensive comparison of every item on the remote side to every item on the client side.

In one embodiment, the cache 230 may include a files folder 231 that includes content-addressable data objects that are already present in the remote repository manager 100. The files folder 231 may be used for local deduplication of files upon upload or download. In one embodiment, the cache 230 may include a new files folder 232 that includes content-addressable data objects that have changed (via modification or creation) from the last commit of a ref in the namespace that has been stored locally. Files in the folder 232 are assumed not to exist in the repository manager 100 and are staged for upload. The client 200 may detect new files and keep track of changes using this folder 232. In one embodiment, the cache 230 may include a metadata folder 233 that includes content-addressable metadata objects (e.g., commits, trees, and tree indices) that are already present in the remote repository manager 100. The metadata folder 233 may be used for local deduplication of metadata upon upload or download. In one embodiment, the cache 230 may include a new metadata folder 234 that includes content-addressable metadata objects that have changed (via modification or creation) from the last commit of a ref in the namespace that has been stored locally. In one embodiment, the cache 230 may include a heads folder 235 that includes files with the names of the refs they represent. One of these head files may contain the hash of the commit that is last known to be the head (most recent) of the ref. In one embodiment, the cache 230 may include a new heads folder 236 that includes files with the names of the refs they represent. These commits are assumed not to exist in the repository manager 100 and may be updated on the remote side, e.g., with a PutRef call. In one embodiment, the cache 230 may include a file indicating the namespace associated with the cache.

In one embodiment, the filesystem 240 may be an implementation of a filesystem in userspace (FUSE). The filesystem 240 may be provided as a runtime dependency of the client library 220. The filesystem 240 may expose the content of a repository locally for a client, based on data present in the cache directory 230. The filesystem 240 may be responsible for keeping track of which files and directories have changed (via the isolation described above), hashing and serializing new content and metadata, and moving it to the appropriate location within the cache 230. Upon being initialized and mounted, the filesystem 240 may be assumed to contain the most recent version of a repository's data and metadata. This assumption may permit the filesystem 240 to asynchronously hash and queue modified files for upload without needing to repeatedly query the remote store 130 on the existence (or lack thereof) of any files or metadata, thereby conserving network bandwidth and freeing the remote components of the repository manager 100 to perform other tasks.

Figure 15A:
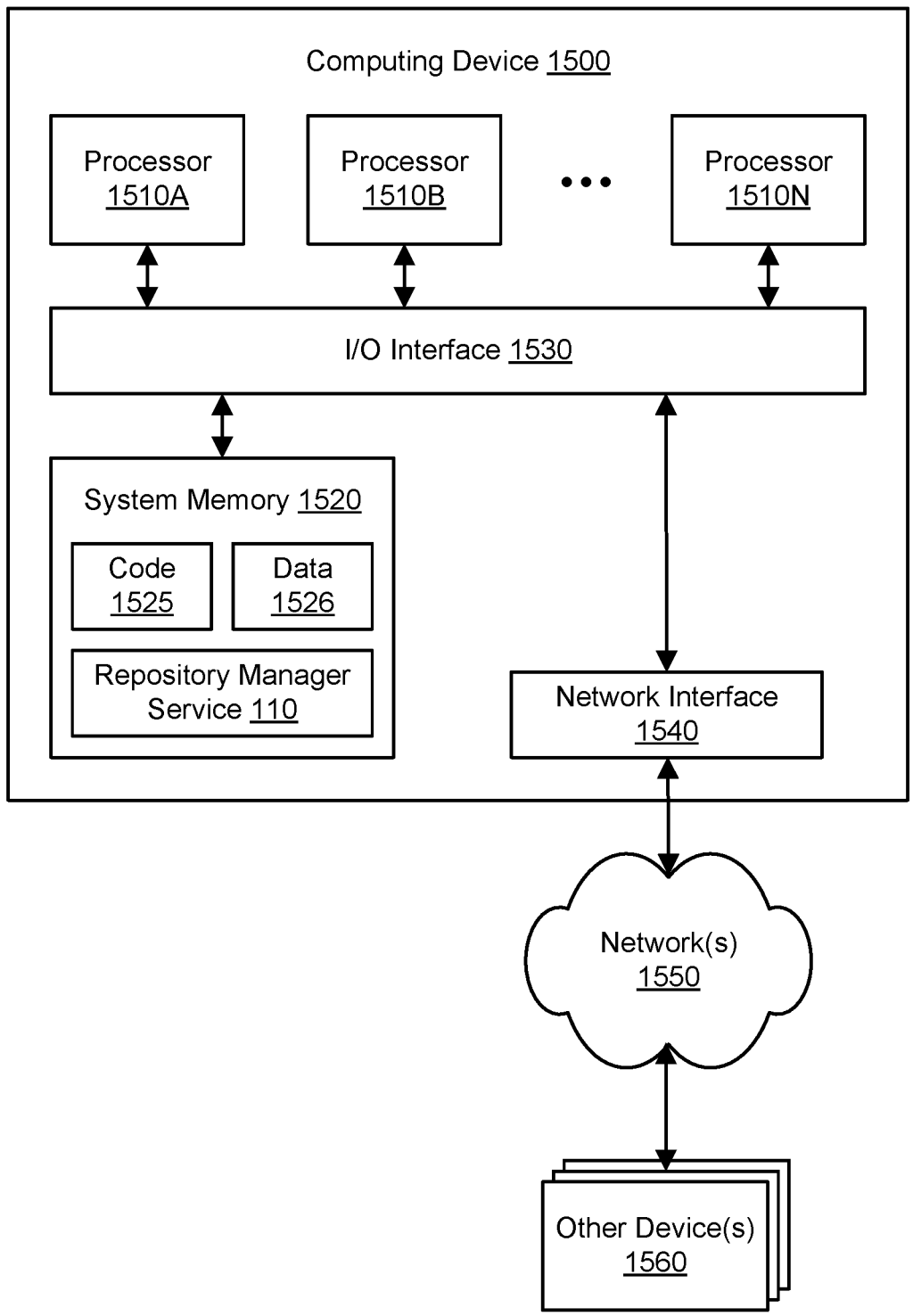
FIG. 15A and FIG. 15B illustrate example computing devices that may be used in some embodiments.

Aspects of the repository manager 100 and client 200 may be implemented using any suitable number and configuration of computing devices, any of which may be implemented by the example computing device 1500 illustrated in FIG. 15A. The computing devices may be located in any suitable number of data centers or geographical locations. In some embodiments, any of the computing devices that implement aspects of the repository manager may represent servers or hosts. In various embodiments, at least some of the functionality of the repository manager 100 may be provided by the same computing device or by different computing devices. If any of the components of the repository manager 100 are implemented using different computing devices, then the components and their respective computing devices may be communicatively coupled, e.g., via one or more networks. Each of the components of the repository manager 100 may represent any combination of software and hardware usable to perform their respective functions, as discussed as follows. Operations implemented by the repository manager 100 may be performed automatically, e.g., without a need for user initiation or user intervention after an initial configuration stage, and programmatically, e.g., by execution of program instructions on at least one computing device. It is contemplated that the repository manager 100 and client 200 may include additional components not shown, fewer components than shown, or different combinations, configurations, or quantities of the components shown.

The repository manager 100 may be implemented in a service-oriented system in which multiple services collaborate according to a service-oriented architecture. For example, the container store 130 may be implemented by one storage service and the database by another storage service. Additionally, the service-oriented system may include the key management service 140 and the token service 160. In such an environment, the repository manager service 110 may offer its functionality as service to multiple clients. A service may be implemented using a plurality of different instances that are distributed throughout one or more networks, and each instance may offer access to the functionality of the corresponding service to various clients. It is contemplated that any suitable number and configuration of clients may interact with the repository manager service 110. To enable clients to invoke its functionality, the repository manager service 110 may expose any suitable interface(s), such as one or more APIs or other programmatic interfaces and/or graphical user interfaces (GUIs). In one embodiment, the functionality of the repository manager service 110 may be offered to clients in exchange for fees. Clients of the repository manager service 110 may represent other users, groups, or entities associated with the same entity that offers the repository manager 100, or the clients may be external users, groups, or entities.

The repository manager service 110 may be coupled to the client 200 and other services via one or more networks. In various embodiments, the network(s) may encompass any suitable combination of networking hardware and protocols necessary to establish network-based communications between the repository manager service 110 and the client 200 or services. For example, the network(s) may generally encompass the various telecommunications networks and service providers that collectively implement the Internet. The network(s) may also include private networks such as local area networks (LANs) or wide area networks (WANs) as well as public or private wireless networks. For example, both the repository manager 100 and the client 200 may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the repository manager 100 and the Internet as well as between the Internet and the client 200. It is noted that in some embodiments, the repository manager 100 may communicate with the client 200 using a private network rather than the public Internet.

In some embodiments, aspects of the repository manager 100 and/or client 200 may be implemented using computing resources of a provider network. A provider network may represent a network set up by an entity such as a business or a public-sector organization to provide one or more services (such as various types of network-accessible computing or storage) accessible via the Internet and/or other networks to a distributed set of clients. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network.

In some embodiments, an operator of the provider network may implement a flexible set of resource reservation, control, and access interfaces for their clients. For example, a resource manager may implement a programmatic resource reservation interface (e.g., via a web site or a set of web pages) that allows clients (potentially including other components within the provider network) to learn about, select, purchase access to, and/or reserve compute instances offered by the provider network. Such an interface may include capabilities to allow browsing of a resource catalog and provide details and specifications of the different types or sizes of resources supported, the different reservation types or modes supported, pricing models, and so on. For example, the client 200 may represent a virtual compute instance that is reserved from a pool of available resources offered by the provider network.

Figure 3:
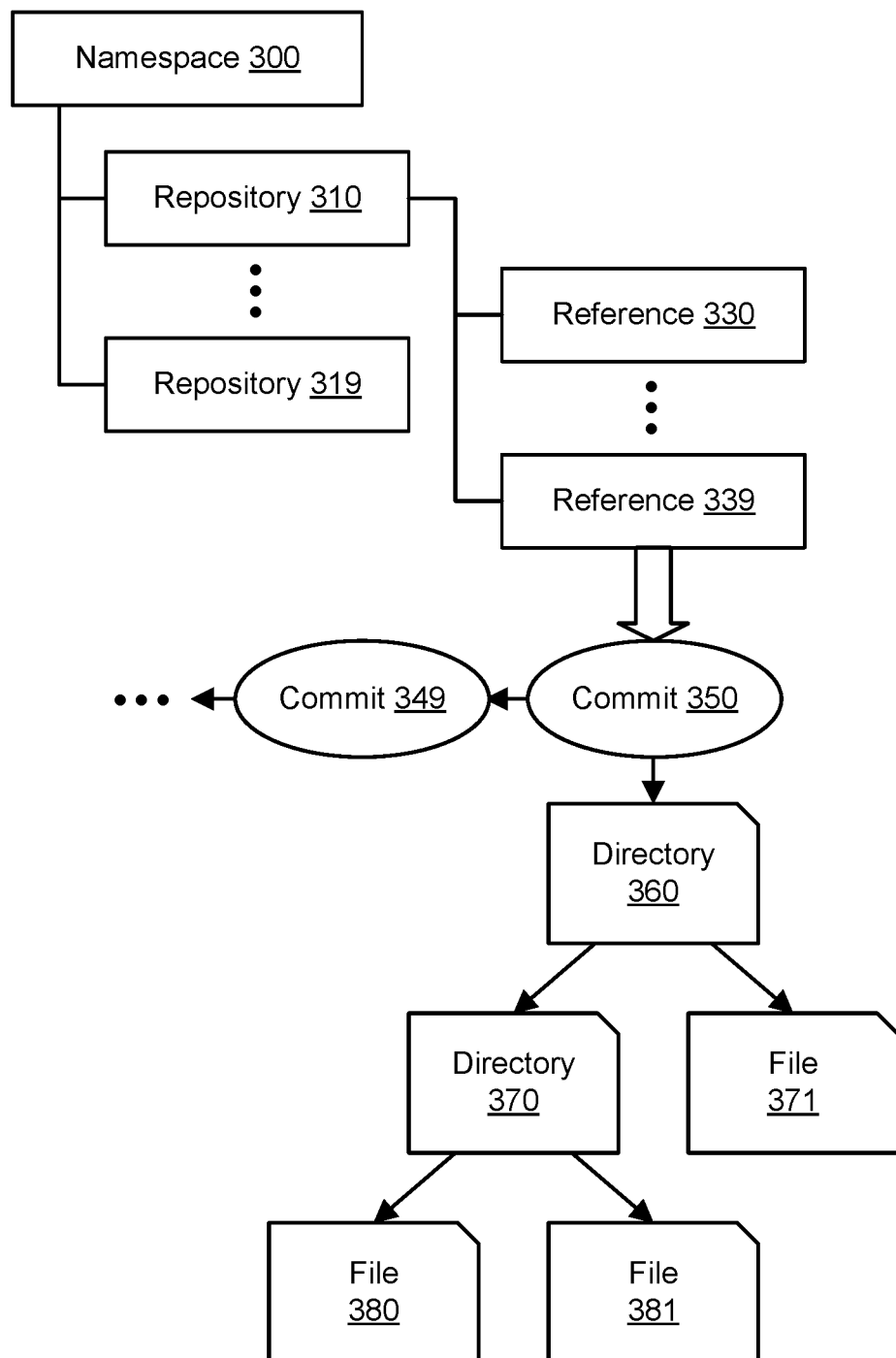
FIG. 3 illustrates further aspects of the example system environment for a client-side filesystem for a remote repository, including an example hierarchy of a namespace with repositories and references that point to an example of a commit with a tree of directories and files, according to some embodiments.
Figure 4A:
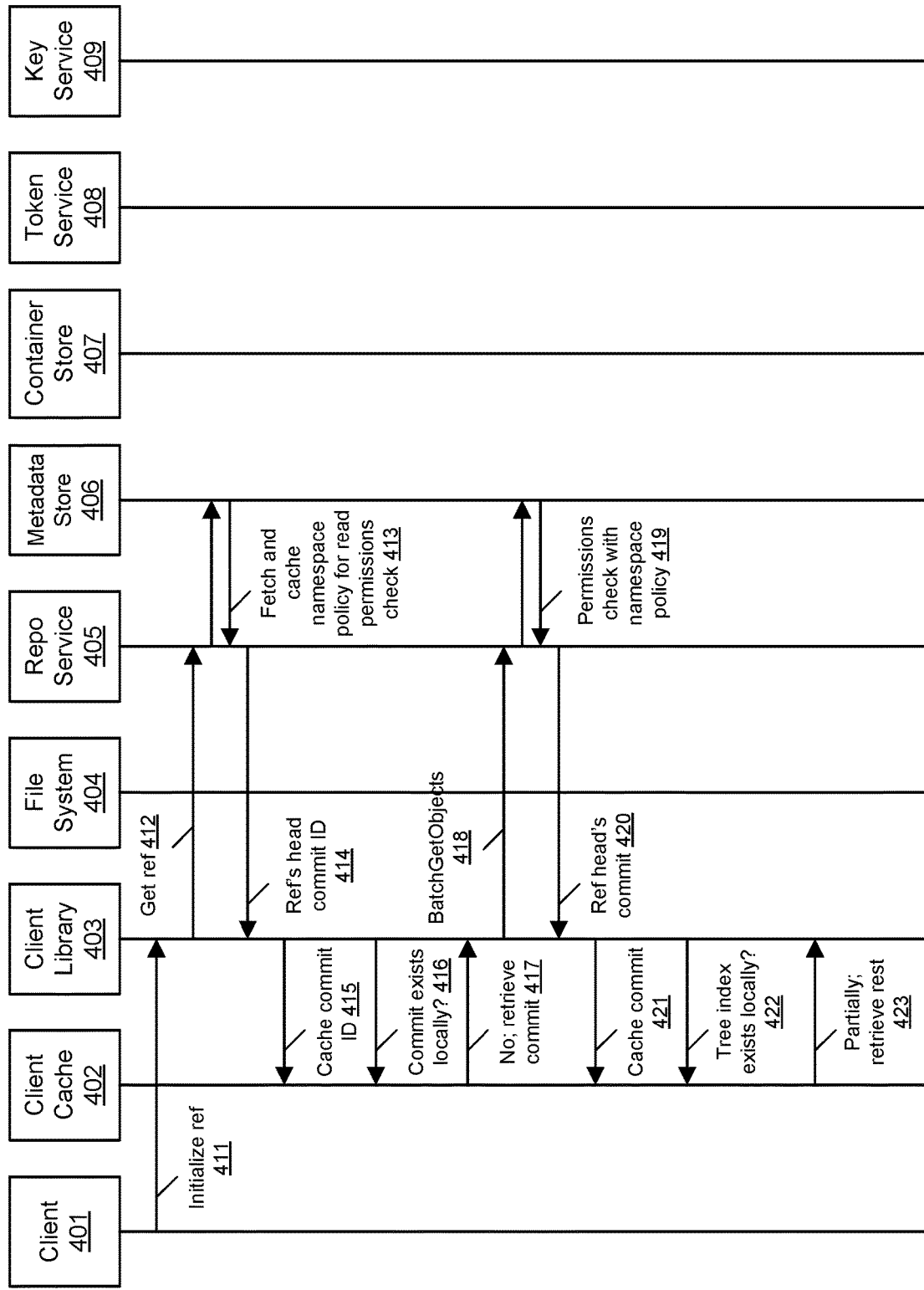
FIGS. 4A, 4B, 4C, and 4D are timing diagrams that illustrate an example of initializing a client-side filesystem for a remote repository, according to some embodiments.
Figure 4B:
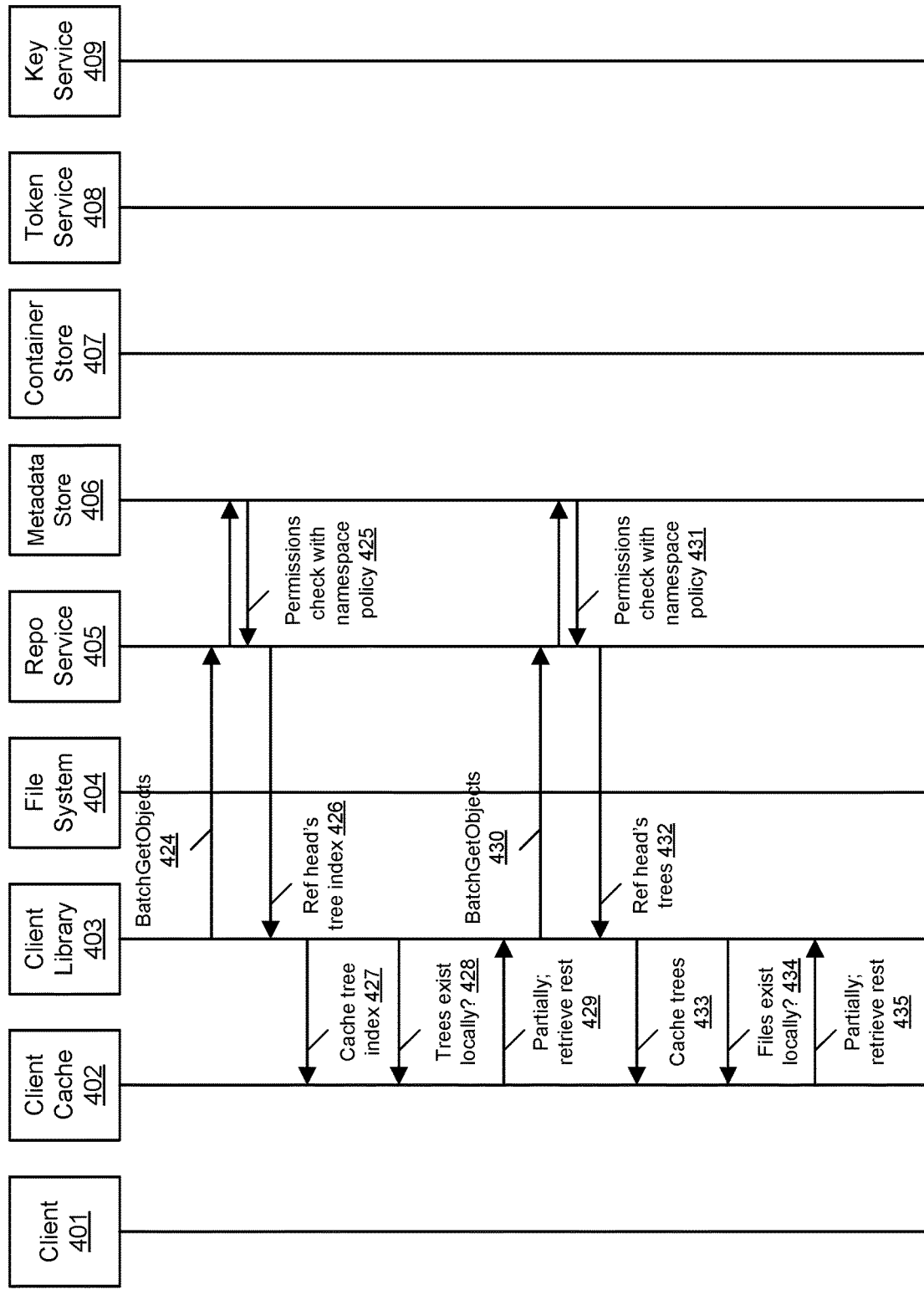
Figure 4C:
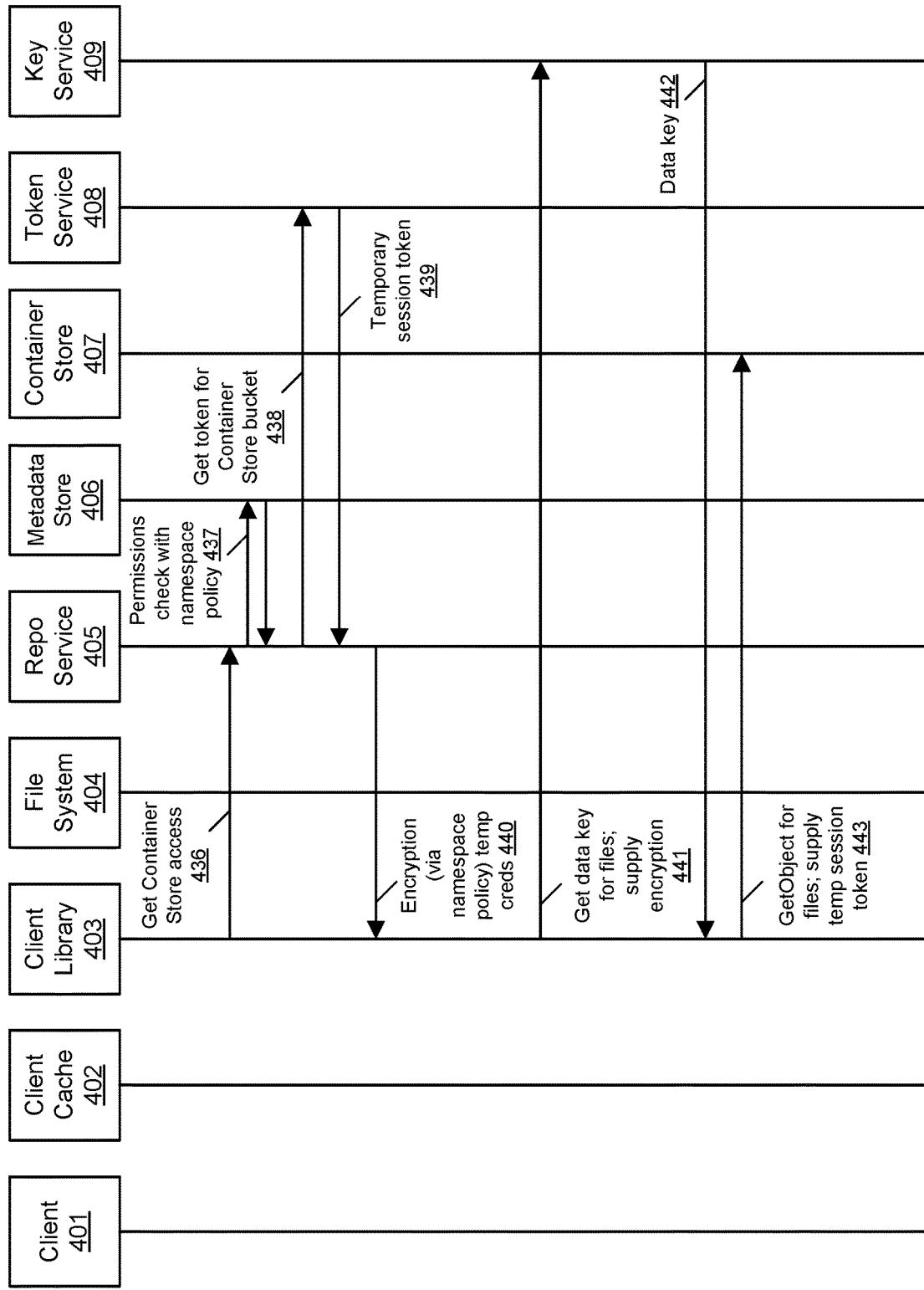
Figure 4D:
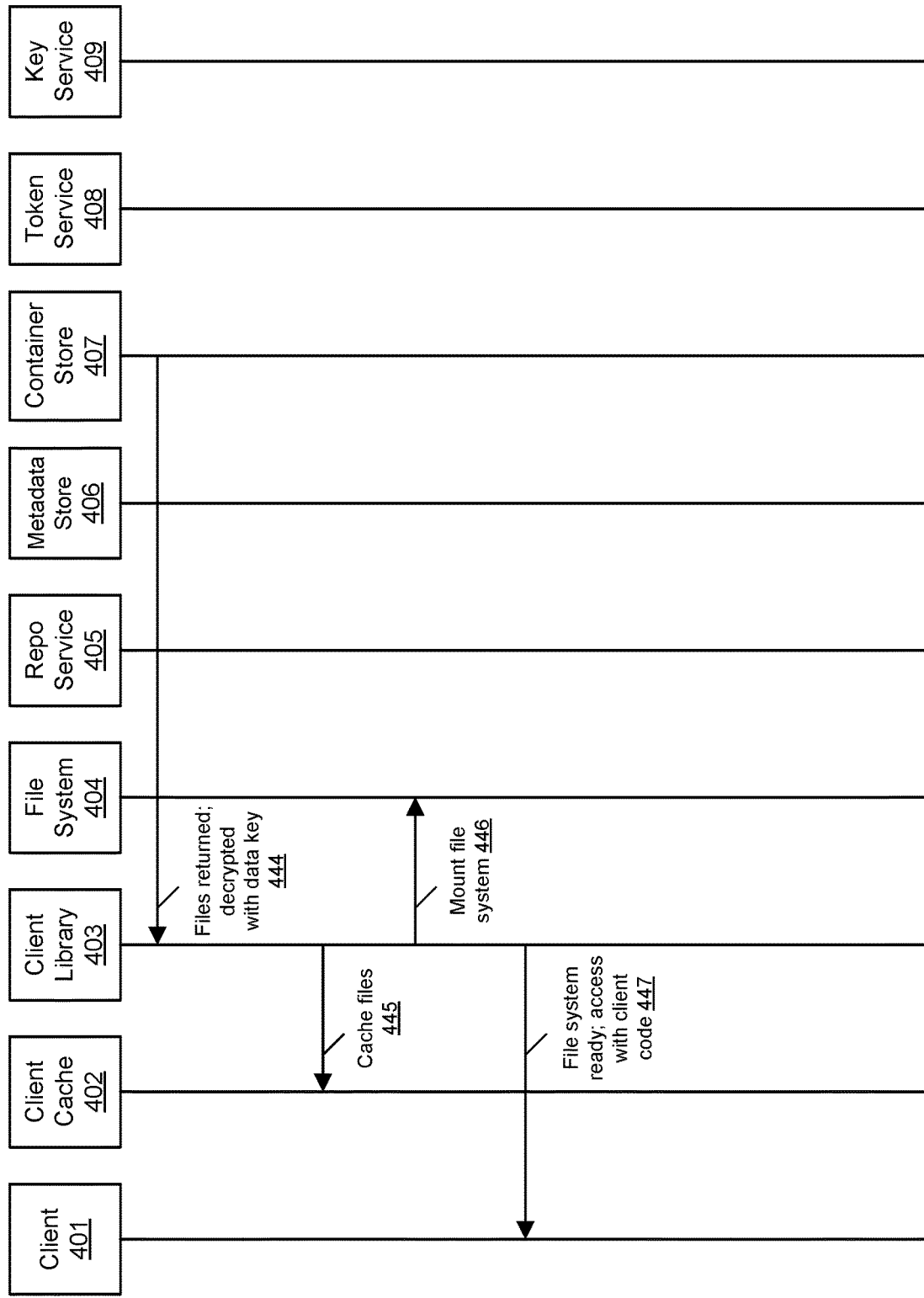
Figure 5A:
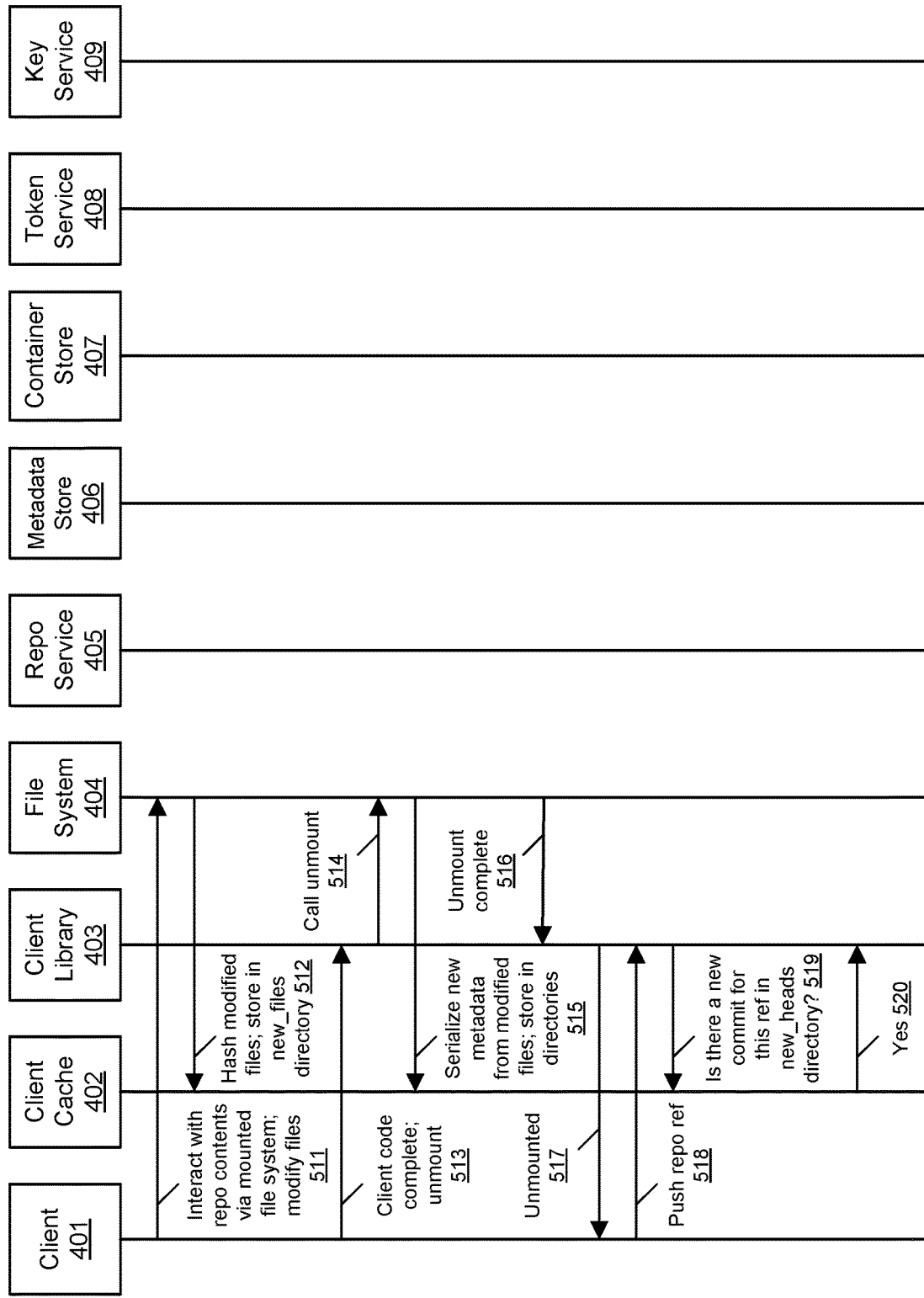
FIGS. 5A, 5B, 5C, and 5D are timing diagrams that illustrate an example of modifying and uploading files using a client-side filesystem for a remote repository, according to some embodiments.
Figure 5B:
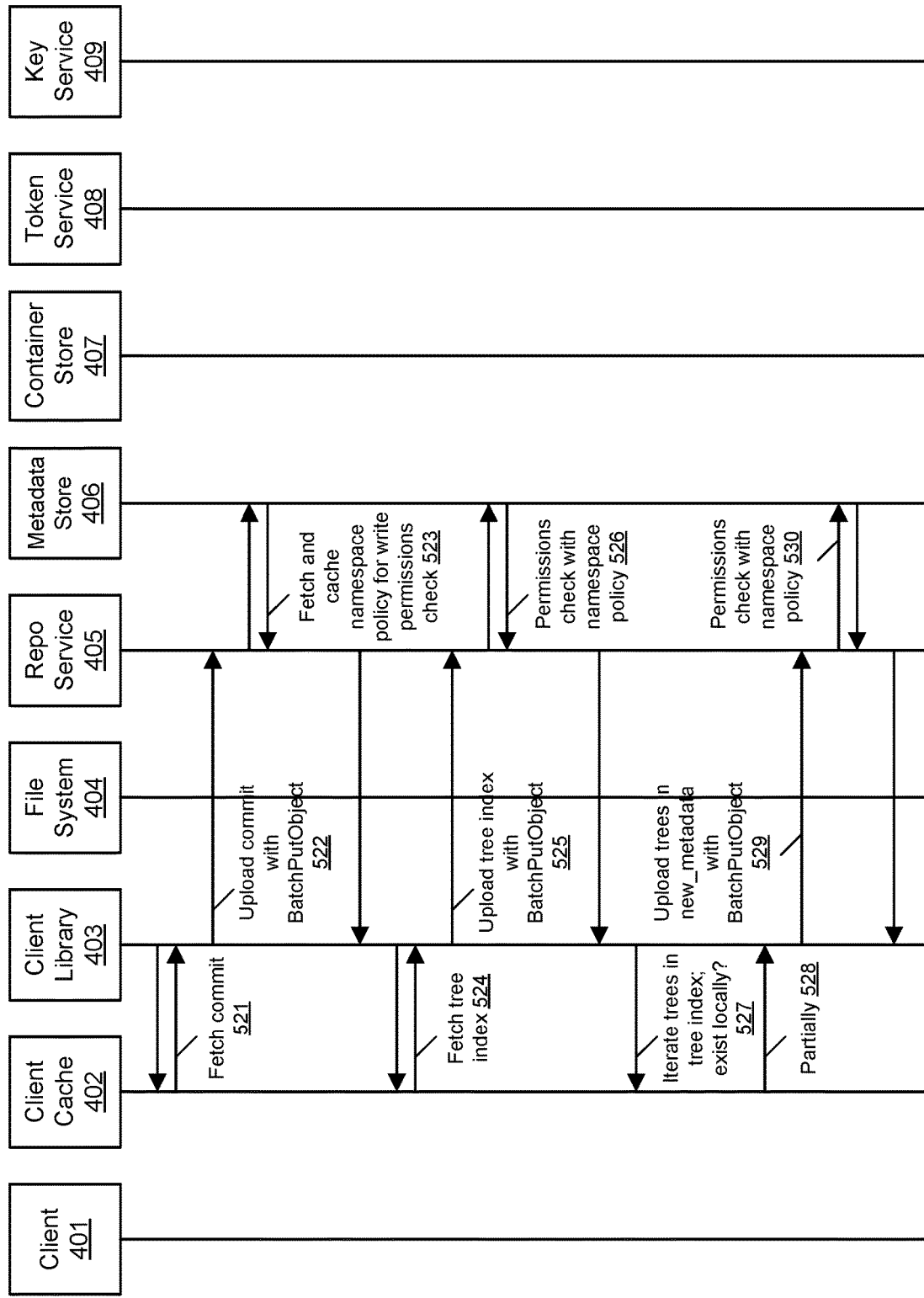
Figure 5C:
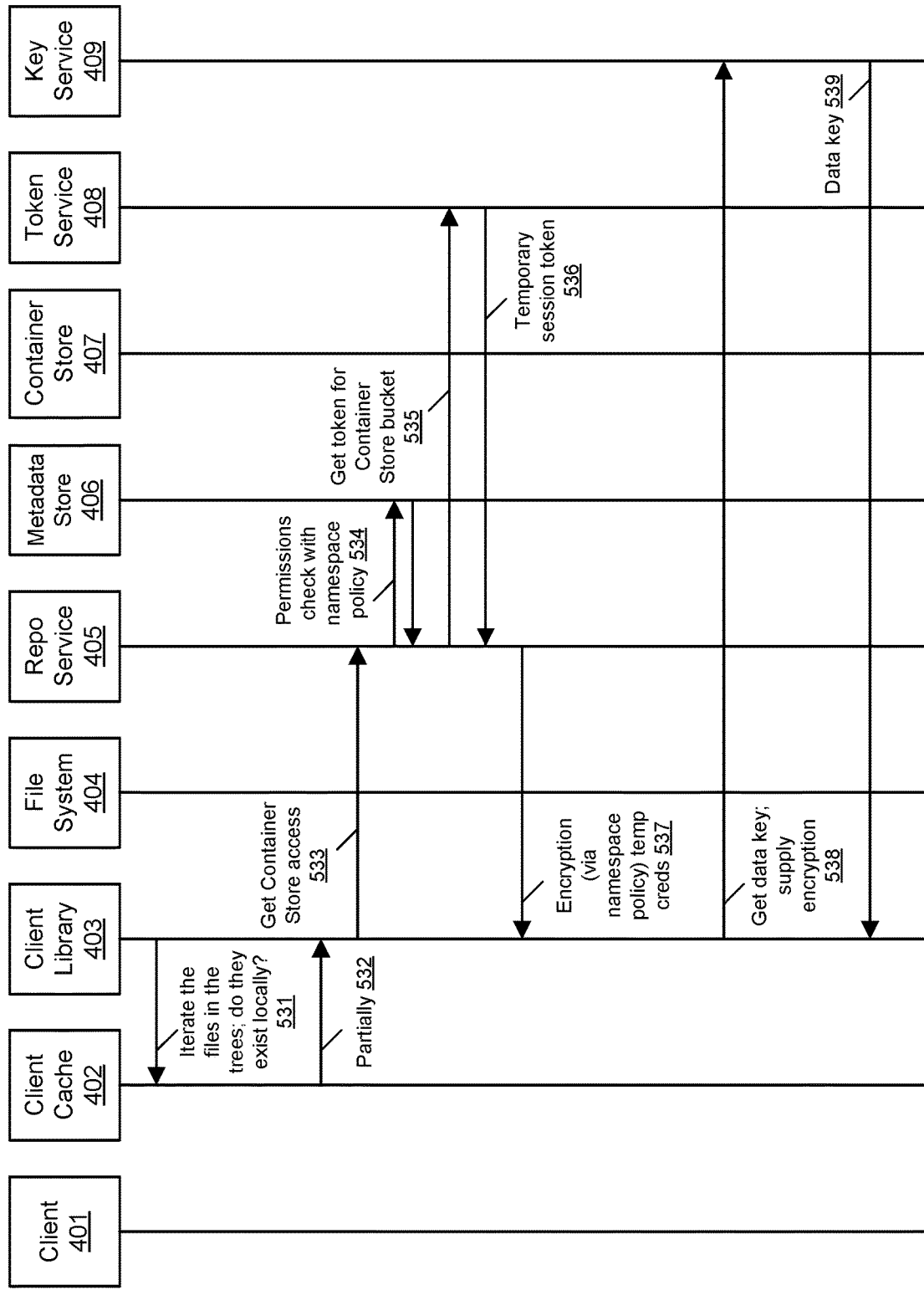
Figure 5D:
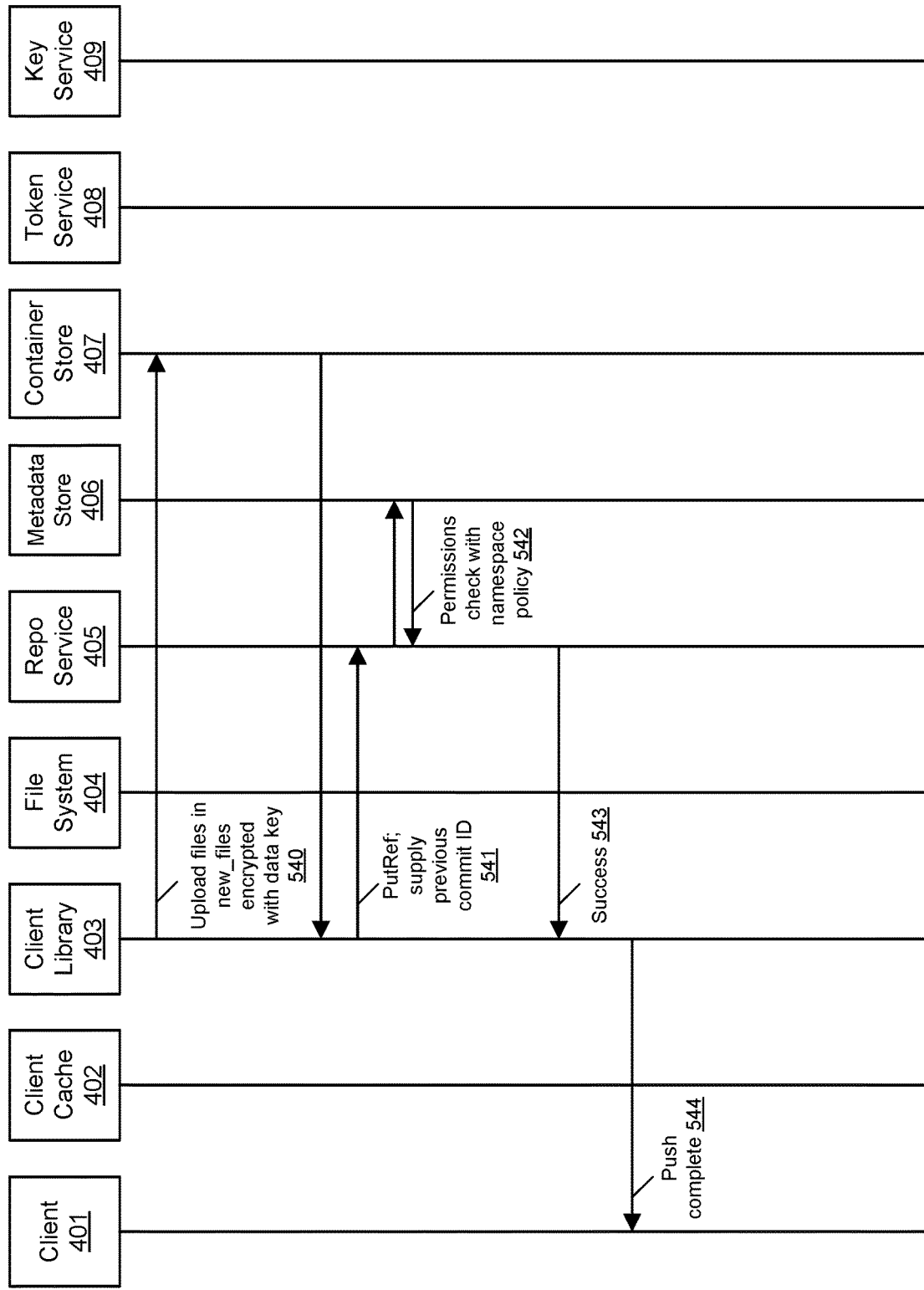

FIG. 3 illustrates further aspects of the example system environment for a client-side filesystem for a remote repository, including an example hierarchy of a namespace with repositories and references that point to an example of a commit with a tree of directories and files, according to some embodiments. In one embodiment, the repository manager 100 may permit a client to create a "commit" that represents the content of a directory structure. A commit may represent a hash tree in which a root node, one or more branch nodes, and one or more leaf nodes are each associated with a hash value. The hash value of a root node or branch node may represent a hash of the contents of subtree that descends from that node. The hash value of a leaf node may represent a hash of the contents of a file or other data object. In one embodiment, if the contents of a leaf node (e.g., file 381) are modified, then a new hash is calculated for the node. A new hash may also be calculated for any branch node (e.g., directory 370) or root node (e.g., directory 360) from which the modified leaf node descends. However, a "sibling" leaf node (e.g., file 380) would keep the same hash if its contents are unchanged, as would a leaf node (e.g., file 371) in a different subtree. The repository manager 100 may use such hash trees to maintain hierarchies of data.

The data managed by the repository manager 100 may be content-addressable according to content hashes. In one embodiment, a content-addressable construct is a hashable piece of metadata (or raw data) stored independently by the repository manager 100 to help present a directory structure to the client. In one embodiment, the lowest-level data construct within the repository manager 100 may be a raw data file (text, binary, etc.) or other data object or item, also referred to as a "blob." The repository manager 100 may not distinguish between different file types of these low-level constructs. Each file or blob may have an associated hash of its content, which the repository manager 100 may use as the "primary key" for addressing and interacting with the data. While such files may be represented as leaf nodes in a hash tree, a directory in a hash tree may contain files or other directories. The root directory 360 may be represented using a data structure that indicates the node type (tree or directory) and hash of directory 370 as well as the node type (leaf or file) and hash of file 371. Similarly, the directory 370 may be represented using a data structure that indicates the node type (leaf or file) and hash of file 380 as well as the node type (leaf or file) and hash of file 871. In one embodiment, an item within a subtree may be associated with various items of metadata, such as its octal mode and permissions, its type (directory or file), its hash, its last modification time, and/or a client-supplied name.

In one embodiment, the repository manager 100 stores a tree index that lists the hashes of all the trees or directories including and descending from the root. For example, a tree index for the tree with root node 360 may include the hash of node 360 and the hash of node 370. The tree index may be used for efficient access to portions of a tree, e.g., to provide a client 200 with only a portion of a tree and not the entire tree for conservation of memory and network resources. The tree index may itself be content-addressable by the hash of the listing of trees.

In one embodiment, a commit 350 stores the metadata associated with a "snapshot" of the contents of a root tree. A commit may include metadata such as a serialization version, a list of one or more parent commits from which this commit is derived (e.g., as represented by the hashes of those parent commits), the hash of the root tree 360 to which this commit 350 points, the hash of the corresponding tree index, the creation date of the commit, an author identifier, and/or a message describing any changes reflected in the commit in comparison to the prior version. As shown in FIG. 3, the commit 350 may identify or reference its parent commit 349, that parent commit 349 may identify or reference its parent commit, and so on, such that a lineage of commits may be traced. The commit 350 may be content-addressable by the hash of all of its metadata.

In one embodiment, a reference or "ref" 339 is a named identifier that stores the hash of the most recent commit 350. Each ref 330-339 may point to a different commit that represents a different version of a repository 310, e.g., at different points in time. The ref 339 may represent a new commit 350 that includes an update to file 381, as indicated for new hash values for file 381, directory 370, and directory 360. The ref 339 may have a human-readable name like "mainline."

In one embodiment, a repository or "repo" 310 is a named collection of refs 330-339. The repository manager 100 may permit clients to "check out" a repository by specifying its name and its ref (or optionally its commit). With this information, the repository manager 100 may be able to construct all the data underneath the given repository for the given ref or commit. In one embodiment, only one client at a time may check out a particular repository.

In one embodiment, a namespace 300 is a named collection of repositories 310-319. A namespace may include one repository or many repositories. Namespaces may allow one or more users (an individual, a team, an organization, etc.) to granulate a set of permissions on who can perform which actions on the repositories that are associated with it. Repositories underneath the same namespace may share the benefit of deduplication of their files, directories, and commits both within the repository manager 100 and in the local cache 230 representation of a repository. In one embodiment, all the files in all the repositories of a namespace may be encrypted with a master key that is unique to that namespace. In one embodiment, a namespace policy may be used to represent the permissions associated with a namespace. For example, a particular namespace may have a policy that indicates permissions for the namespace owner, for a data reader, and for a data writer.

The components shown in FIG. 3 may be used in numerous computing domains. For example, the namespace 300 may be named Billing.Usage and may be used by a team that calculates bills for usage of computing resources in a provider network. The repository 310 may be named Acct123-UsageRecords and may be associated with usage records for a particular customer account. Similarly, the repository 319 may be named Acct999-UsageRecords and may be associated with usage records for a different customer account. The repositories 310-319 may represent a very large number of records produced over time. The references 330-339 may be named for months or other accounting periods. The commit 350 may represent a hash value for a tree 360 of usage records. The directory 370 may represent a particular day of the month, and the files 380 and 381 may represent particular hours within that day. The usage records in the commit 350 may be used, for example, to calculate a bill for a customer account associated with the repository 310 according to a particular pricing plan.

FIGS. 4A, 4B, 4C, and 4D are timing diagrams that illustrate an example of initializing a client-side filesystem for a remote repository, according to some embodiments. FIGS. 4A, 4B, 4C, and 4D illustrate a sequence of events and interactions among various components of the local client 200 and remote repository manager 100, including the client software 401, the client-side cache 402, the client-side repository manager library 403, the client-side filesystem 404, the remote repository manager service 405, the remote metadata store 406 (e.g., the database 150), the remote container store 407, the remote token service 408, and the remote key service 409, any of which may be implemented using the respective components of FIG. 2.

As shown by 411, the client software 401 may send a ref of a repository to the client library 403 to perform initialization of the filesystem. As shown by 412, the client library 403 may ask to get the ref from the repository manager service 405. As shown by 413, the repository manager service 405 may fetch and cache the namespace policy for read permissions from the metadata store 406. As shown by 414, the repository manager service 405 may provide the ref's head ID to the client library 403. As shown by 415, the client library 403 may cache the commit ID in the cache 402. As shown by 416, the client library 403 may ask whether the commit exists locally in the cache 402. As shown by 417, the client cache 402 may respond that the commit does not exist locally. As shown by 418, the client library 403 may use the BatchGetObjects API of the repository manager service 405. As shown by 419, the repository manager service 405 may interact with the metadata store 406 to perform a permissions check with the namespace policy. As shown by 420, the repository manager service 405 may send the ref's head commit to the client library 403. As shown by 421, the client library 403 may cache the commit. As shown by 422, the client library 403 may ask whether the tree index exists locally. As shown by 423, the client cache 402 may respond that the some of the tree index does exist, but the remainder should be retrieved.

As shown by 424, the client library 403 may use the BatchGetObjects API of the repository manager service 405 to request the tree index. As shown by 425, the repository manager service 405 may interact with the metadata store 406 to perform a permissions check with the namespace policy. As shown by 426, the repository manager service 405 may send the ref head's tree index to the client library 403. As shown by 427, the client library 403 may cache the tree index. As shown by 428, the client library 403 may ask whether the trees in the tree index exist locally. As shown by 429, the client cache 402 may respond that the some of the trees do exist, but the remainder should be retrieved. As shown by 430, the client library 403 use the BatchGetObjects API of the repository manager service 405 to request the trees. As shown by 431, the repository manager service 405 may interact with the metadata store 406 to perform a permissions check with the namespace policy. As shown by 432, the repository manager service 405 may send the ref head's trees to the client library 403. As shown by 433, the client library 403 may cache the trees. As shown by 434, the client library 403 may ask whether the files exist locally. As shown by 435, the client cache 402 may respond that the some of the files do exist, but the remainder should be retrieved.

As shown by 436, the client library 403 may request access to the container store from the repository manager service 405. As shown by 437, the repository manager service 405 may interact with the metadata store 406 to perform a permissions check with the namespace policy. As shown by 438, the repository manager service 405 may ask for a token for the container store. As shown by 439, the token service 408 may respond with a temporary session token. As shown by 440, the repository manager service 405 may provide the client library 403 with a resource identifier of the encryption (via the namespace policy) temporary credentials. As shown by 441, the client library 403 may supply the encryption identifier to the key service 409 and ask for the data key for the files. As shown by 442, the key service 409 may respond with the data key. As shown by 443, the client library 403 may supply the temporary session token and use the GetObjects API to get the files from the container store 407.

As shown by 444, the container store 407 may respond with the files, where the data key can be used by the client library 403 to decrypt the files. As shown by 445, the client library 403 may cache the files. As shown by 446, the client library 403 may mount the file system 404. As shown by 447, the client library 403 may report to the client software 401 that the filesystem is ready and can be accessed by the client-specific code.

FIGS. 5A, 5B, 5C, and 5D are timing diagrams that illustrate an example of modifying and uploading files using a client-side filesystem for a remote repository, according to some embodiments. FIGS. 5A, 5B, 5C, and 5D illustrate a sequence of events and interactions among various components of the local client 200 and remote repository manager 100, including the client software 401, the client-side cache 402, the client-side repository manager library 403, the client-side filesystem 404, the remote repository manager service 405, the remote metadata store 406 (e.g., the database 150), the remote container store 407, the remote token service 408, and the remote key service 409, any of which may be implemented using the respective components of FIG. 2.

As shown by 511, the client software 401 may interact with local copies of repository contents via the mounted filesystem 404. As shown by 512, the local filesystem 404 may hash the modified files and store the hashes in the new files directory in the local cache. As shown by 513, the client software 401 may request to the client library to unmount the filesystem. As shown by 514, the client library 403 may call unmount to the filesystem. As shown by 515, the local filesystem 404 may serialize the new metadata from modified (or new) files and store the results in appropriate directories in the cache. As shown by 516, the local filesystem 404 may report to the client library 403 that unmounting is complete. As shown by 517, the client library 403 may report to the client software 401 that unmounting is complete. As shown by 518, the client software 401 may push the ref of the repository to the client library 403. As shown by 519, the client library 403 may ask if there is a new commit for this ref in the new heads directory. As shown by 520, the client cache 402 may respond affirmatively.

As shown by 521, the client library 403 may fetch the commit from the local cache. As shown by 522, the client library 403 may upload the commit to the repository manager service 405 using the BatchPutObject API. As shown by 523, the repository manager service 405 may fetch and cache the namespace policy for write permissions from the metadata store 406. As shown by 524, the client library 403 may fetch the tree index from the local cache. As shown by 525, the client library 403 upload the tree index to the repository manager service 405 using the BatchPutObject API. As shown by 526, the repository manager service 405 may interact with the metadata store 406 to perform a permissions check with the namespace policy. As shown by 527, the client library 403 may iterate through the trees in the tree index and ask whether they exist in the local cache. As shown by 528, the client cache 402 may respond that only some of the trees exist. As shown by 529, the client library 403 may upload the trees in the new metadata folder to the repository manager service 405 using the BatchPutObject API. As shown by 530, the repository manager service 405 may interact with the metadata store 406 to perform a permissions check with the namespace policy.

As shown by 531, the client library 403 iterate through the files in the trees and ask whether they exist in the local cache. As shown by 532, the client cache 402 may respond that only some of the files exist. As shown by 533, the client library 403 may request access to the container store from the repository manager service 405. As shown by 534, the repository manager service 405 may perform a permissions check with the namespace policy. As shown by 535, the repository manager service 405 may ask for a token for the container store. As shown by 536, the token service 408 may respond with a temporary session token. As shown by 537, the repository manager service 405 may provide the client library 403 with a resource identifier of the encryption (via the namespace policy) temporary credentials. As shown by 538, the client library 403 supply the encryption identifier to the key service 409 and ask for the data key for the files. As shown by 539, the key service 539 the key service 409 may respond with the data key.

As shown by 540, the client library 403 may upload the files in the new files directory as encrypted with the data key. As shown by 541, the client library 403 may use the PutRef API and supply the previous commit ID. As shown by 542, the repository manager service 405, the repository manager service 405 may perform a permissions check with the namespace policy. As shown by 543, the repository manager service 405 may report success to the client library 403. As shown by 544, the client library 403 may report to the client software 401 that the push is complete.

In one embodiment, the client library 220 may perform uploads and downloads in a highly parallelized manner. In one embodiment, when the client passes a list of refs to pull, the refs are immediately added to a queue. A pool of worker threads may be spun up to handle resolving the refs by pulling the commit IDs from the metadata store and adding each of these commits to a queue. In one embodiment, each set of tasks does not start until the previous one completes. In one embodiment, this process repeats itself until all the files have been downloaded to the client. Using these queues, the client library may be able to parallelize the download and upload of large directory structures while performing deduplication of uploads and downloads locally in the cache.

Figure 6:
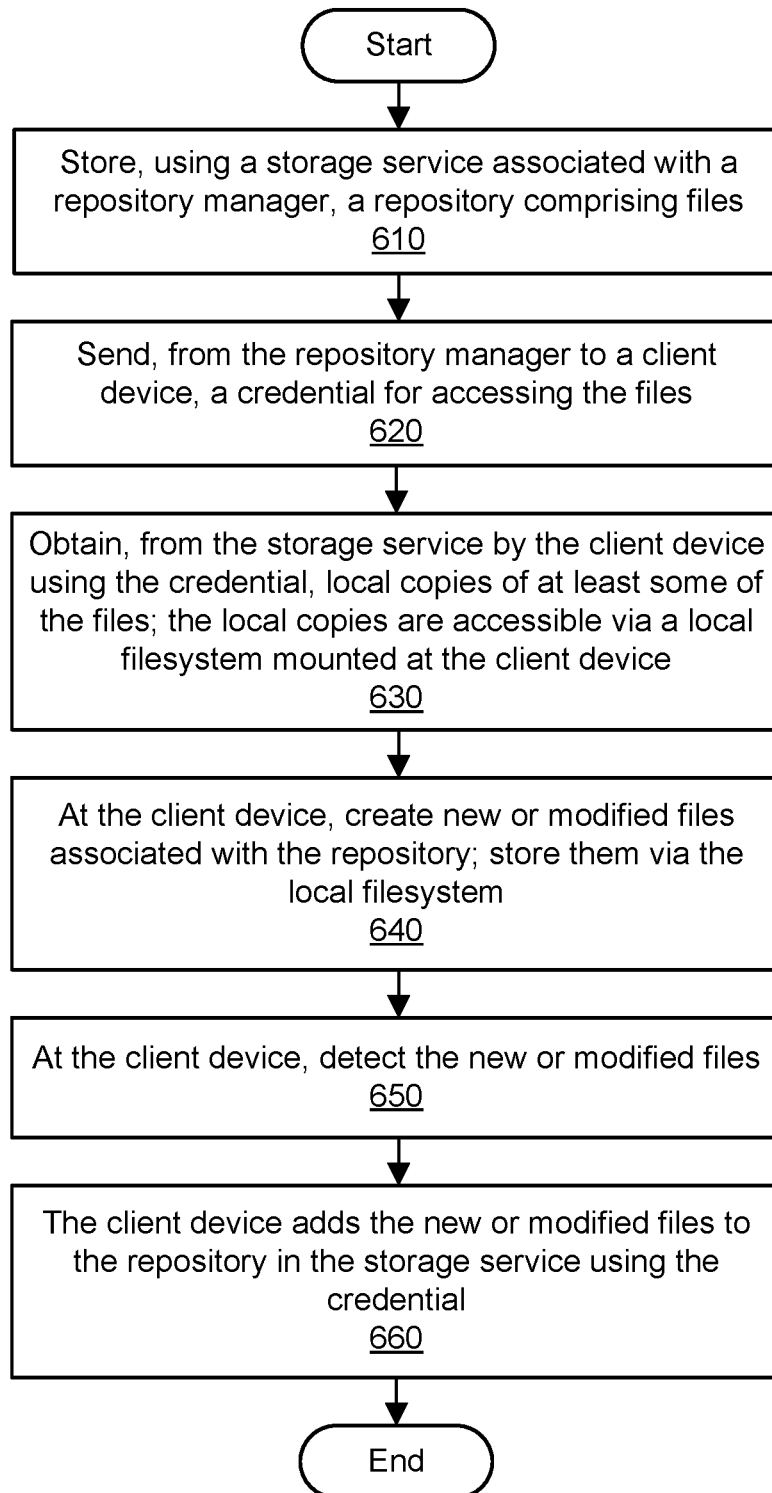
FIG. 6 is a flowchart illustrating a method for using a client-side filesystem for a remote repository, according to some embodiments.

FIG. 6 is a flowchart illustrating a method for using a client-side filesystem for a remote repository, according to some embodiments. As shown in 610, a repository manager may use a storage service to store a repository comprising files. The files within a repository may be organized according to a hierarchy. The repository may include content-addressable data such that files and directories are accessible via their content hashes. The repository may be considered immutable such that new versions of files and directories may be added, while older versions may be retained.

As shown in 620, the repository manager may send a credential to a client device. For example, the credential may be sent to the client device in order to initialize a local version of the repository on the client device. The credential may permit access (e.g., read access and/or write access) to the files of the repository in the storage service. The credential may represent a temporary access token provided by a token service. The credential may include a pre-signed uniform resource locator (URL) by which the repository may be accessed. In one embodiment, a repository manager service that is distinct and separate from the storage service may send the credential to the client.

As shown in 630, local copies of at least some of the files may be sent from the storage service to a client device. The local copies may be stored in a local cache memory at the client device. The local copies may be accessible via a local filesystem mounted at the client device. A client library on the client device may provide an interface to the remote components of the repository manager.

As shown in 640, new or modified files may be created at the client device. The new or modified files may be associated with the same repository. The new or modified files may be generated based (at least in part) on the local copies in the cache. The new or modified files may be stored in the cache via the local filesystem. In one embodiment, the new or modified files may be isolated from the unmodified local copies, e.g., by storing the new or modified files in their own directory or portion of the cache. As shown in 650, the new or modified files may be detected or differentiated at the client device. In one embodiment, the new or modified files may be detected based (at least in part) on their isolation from the unmodified local copies. In one embodiment, the new or modified files may be detected based (at least in part) on differences in their content hashes with respect to the unmodified local copies.

As shown in 660, the client device may add the new or modified files to the repository in the storage service using the credential. In doing so, the client device may not send any unmodified files to the storage service and may not further interact with the repository manager to determine which files of the repository are new or modified. The credential may be cached at the client device and re-used for multiple files, e.g., within the same session. By determining which files to send on the client side and not on the remote side, the repository manager may be freed of the responsibility to perform computationally expensive and time-consuming comparisons of new data to old data. By permitting the client to add files to the repository directly using the credential and without needing to involve the repository manager service for every file, the repository manager may scale to a large number of clients, repositories, and files.

Orchestration of Computations Using a Remote Repository

Figure 7:
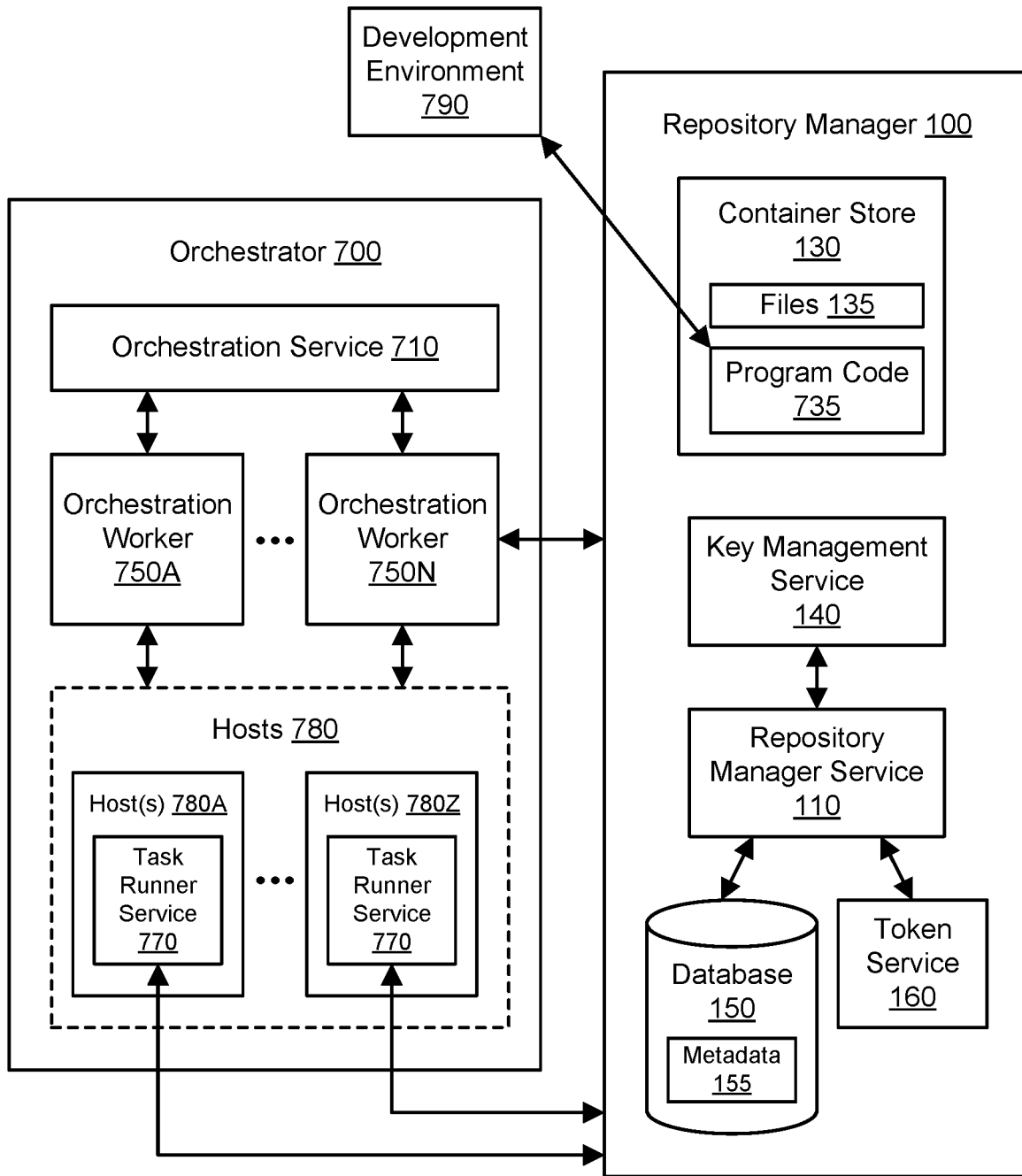
FIG. 7 illustrates an example system environment for orchestration of computations using a remote repository, including the use of the repository manager to store program code for computations, according to some embodiments.

FIG. 7 illustrates an example system environment for orchestration of computations using a remote repository, including the use of the repository manager to store program code for computations, according to some embodiments. In one embodiment, a computation orchestrator 700 manages computations across a fleet of hosts 780 such as hosts 780A-780Z. The orchestrator 700 may enable reproducibility of computations. The orchestrator 700 may record the inputs to a computation, the program code for a computation, and the outputs of a computation using the repository manager 100. The orchestrator 700 may then manage the replay of a computation using the same input(s) and the same program code as recorded using the repository manager 100. In one embodiment, the orchestrator 700 may compare the outputs of a replayed computation to the originally recorded outputs to ensure that the computation was performed in a substantially identical manner. A computation may be replayed at any point in time, as long as the input(s) and program code remain available from the repository manager 100. In one embodiment, inputs(s) (in the form of files 135) and program code 735 may be deemed immutable and may be retained by the repository manager 100 for an indefinite length of time. As changes are made over time, different versions of files 135 and program code 735 may be added to the container store 130, and earlier versions may be retained. In one embodiment, any of the hosts 780A-780Z may access the repository manager 100 by acting as a client 200 as shown in FIG. 2.

As an example of a computation managed by the orchestrator 700 and repository manager 100, the inputs may represent usage records for one or more accounts and a pricing model, and the computation may produce a bill for the one or more accounts based (at least in part) on the usage records and the pricing model. The bill may be calculated based on program code for a computation. Over time, additional usage records may be added to the container store 130, and/or the program code for the computation may be modified. However, using the orchestrator 700, the original computation may be performed again using the original usage records, the original pricing model, and the original program code as recorded by the repository manager 100. For example, the replay of the computation may be initiated based (at least in part) on a customer request to verify the bill, and that customer request may be received months or years after the original computation is performed.

In one embodiment, the program code 735 for a computation may be provided to the repository manager 100 via a development environment 790. The development environment 790 may represent an environment for writing, building, modifying, and/or testing program code in any suitable programming language or platform. Using the development environment 790, one or more developers may contribute to the program code 735. In one embodiment, different portions of the program code 735 may be developed and/or owned by different teams or groups within an organization. In one embodiment, different portions of the program code 735 may represent different programming languages or execution platforms. The different portions of the program code 735 may represent different steps or stages of a workflow or pipeline, as discussed with reference to FIG. 1. The program code 735 may be stored by the repository manager 100 using the container store 130 in a similar manner as the files 135. The program code 735 may be written to the container store 130 directly by the developer or development environment 790 or indirectly, e.g., by interacting with the repository manager service 110.

In one embodiment, the orchestrator 700 may include a task runner service 770 that implements execution of tasks, computations, or other operations associated with workflows or task flows. The task runner service 770 may include multiple instances, or task runner service endpoints, that are network-accessible by the orchestration workers 750A-750N. The task runner service 770 may be implemented on each of the hosts 780A-780Z. Upon being instructed to do so by a responsible orchestration worker, the task runner service 770 may perform a computation using one or more hosts. In one embodiment, a workflow may represent a group of steps that are executed in a particular order, and a step may represent a domain-agnostic wrapper around a use case. In one embodiment, a task flow may represent a group of tasks that are executed in a particular order, and a task may represent a domain-specific set of logic that typically takes input from the repository manager 100 and produces output for storage using the repository manager. The orchestration workers 750A-750N may be responsible for executing the logic corresponding to each step in a workflow, e.g., domain-agnostic steps. The task runner service 770 may be responsible for executing task flows, e.g., domain-specific computations.

Any of the hosts 780A-780Z may represent various types of computing resources such as virtual compute instances, clusters having multiple nodes, and so on. A computation performed by one or more hosts may represent a step in a workflow, and different steps may be assigned to different hosts 780A-780Z running concurrently or serially. A workflow may be configured to perform a computation for many entities. Entities may represent customer accounts, primary keys, and so on. For example, a workflow may be configured to calculate a bill for any number of accounts, based (at least in part) on usage records and a pricing model. Entities may be divided into subsets by the orchestrator and assigned to different hosts 780A-780Z. For example, half of the accounts may be processed using host(s) 780A, while the other half of the accounts may be processed using host(s) 780Z. In one embodiment, such subsets may be determined in order to optimize for execution time across the fleet of hosts, for resource usage or performance metrics, and/or for cost. A component of the orchestrator 700 such as an orchestration worker may manage the division of computation for a workflow or workflow step among various hosts.

The orchestration service 710 may permit users to define, modify, and initiate orchestrated computations such as workflows. The orchestration service 710 may offer one or more APIs or other programmatic interfaces that permit parts of its functionality to be invoked by users or other external clients. In some embodiments, the orchestration service 710 may offer APIs or other programmatic interfaces such as CreateOrchestration, DeleteOrchestration, StartExecution, StopExecution, ListOrchestrations, and ListExecutionsForOrchestration. The orchestration service 710 may thus provide a client-facing component of the orchestrator 700. In one embodiment, the orchestration service 710 may permit only a single execution of a given orchestration to be in progress at a given time. However, an orchestration may represent a computation performed over and over again for many different entities. In one embodiment, the orchestration service 710 may pass the identity of the caller to orchestration workers so that clients may have fine-grained control over who can and cannot start and stop executions.

In one embodiment, after the orchestration service 710 invokes a workflow, one or more orchestration workers 750A-750N may be assigned to manage the execution of one or more steps in the workflow. A step may also be referred to as computation. In one embodiment, a given step may be assigned to a given one of the workers 750A-750N, and the worker may then use as many hosts 780A-780Z as needed to perform the step. In managing the execution of a step, an orchestration worker may divide a set of entities into various subsets and may assign different subsets to different sets of hosts. For example, if a computation seeks to generate bills for a set of accounts, then the responsible orchestration worker may use host(s) 780A to process half of the accounts and host(s) 780Z to process the other half of the accounts. In one embodiment, the orchestration workers may provide redundancy such that the same step can be executed on more than one host, e.g., for failover. In one embodiment, the orchestration workers may provide single execution such that a step is executed on a single host at a given time.

A computation may be performed with respect to multiple entities, also referred to as keys. For example, a particular entity or key may relate to a particular customer account. In some embodiments, a single computation may be orchestrated for millions of entities. For a workflow with a large number of entities, an orchestration worker may start one workflow for all the entities rather the many entity-specific workflows. The single workflow may include a step that is responsible for performing the computation for all of the entities. This step may be executed using one or more task runner nodes, hosts, or other computing resources. Rather than run a step for each entity, computations may be run for different (non-overlapping) subsets of the entities. The orchestration worker may track the state for each of the computations rather than for each of the entities. The orchestrator 700 may use a knowledge of cache contents at particular hosts 780A-780Z to make intelligent decisions about the allocation of work to those hosts. In one embodiment, an orchestration worker may monitor the performance of individual hosts 780A-780Z and redistribute work from one host to another host based (at least in part) on that performance monitoring. In one embodiment, an orchestration worker may monitor the performance of individual hosts 780A-780Z and assign the next round of work to hosts based (at least in part) on that performance monitoring.

The task runner service 770 may take a task flow as input and may execute it using a suitable number and configuration of computing resources, e.g., a cluster with a particular number of nodes. The program code 735 executed by the task runner host may expect inputs to be in particular locations or directories of a filesystem, e.g., a local filesystem 240 associated with the repository manager 100. In one embodiment, a task is runnable from the command line. In one embodiment, a task is idempotent. In one embodiment, data required for executing a task is passed to the task via argument. In one embodiment, a task references and reads input data via a path on a local filesystem. In one embodiment, a task references and writes output data via a path on a local filesystem. In one embodiment, each task in a task flow has an executable name, a map of <string, repository references> to be used as inputs, a map of <string, repository references> to be used as outputs, and a map of <string, repository references> to be used as the runtime executable to perform the computation.

In one embodiment, computations in an orchestration may be performed using a serverless computation service. The computation service may be invoked by a client to run program code or perform business logic without the client needing to provision or manage servers. In one embodiment, the task runner service 770 may interact with the computation service to perform individual computations on demand. Whether using or not using the computation service, the orchestrator 700 may record inputs, outputs, the business logic or program code employed in the computation, information about any compute virtualization used in the computation (e.g., the type and version of a virtual machine), a dependency chain, and any other information usable to reconstruct an equivalent infrastructure in order to repeat the computation at a future time.

Using the techniques described herein, computations and workflows may be orchestrated to make efficient use of computational resources, memory resources, and network resources while permitting archiving, replay, and auditing. The orchestrator 700 may scale the number of concurrently used hosts up or down. The number of hosts and/or type of hosts used for a step may vary based on the computational resources required for the step. For example, the number of hosts may tend to increase as the number of entities increases for a computation. As another example, computations associated with domains such as scientific computing, simulation, and machine learning may be assigned to specialized hosts having different hardware capabilities and/or configurations than typical hosts.

The orchestrator 700 may perform per-entity exception handling such that the computation for some entities in a batch may continue even after the computation has failed for other entities in the batch. As discussed above, a computation for a set of entities may be distributed across hosts 780A-780Z using parallel computations for various subsets of the entities. If one subset fails, e.g., due to software misconfiguration or hardware failure, then the remaining entities in the subset may be reassigned to one or more other hosts by the responsible orchestration worker. In one embodiment, if the computation fails for a particular entity within a subset, then the failure may be reported by the host to the responsible orchestration worker, but the computation may continue for unaffected entities using the same host(s) or different host(s). In one embodiment, such failover may be implemented by transferring a virtual storage volume (e.g., a virtual block-based store) from a failed host to another host. In one embodiment, the orchestrator 700 may collect per-entity execution metrics, e.g., the execution time and/or resource usage for the computation as applied to a particular entity. In one embodiment, additional downstream compute tasks may be performed for entities with successful computations but not for entities with failed computations.

As discussed above, a computation for a set of entities may be distributed across hosts 780A-780Z using parallel computations for various subsets of the entities. The orchestrator 700 may maintain a mapping of entities to hosts and may assign computations to hosts based on the mapping. For example, during one computation a particular host may process data associated with a particular entity. During that computation, files 135 associated with that entity may be obtained by the host from the repository manager 100, and/or an output of the computation may be stored by the host. If the orchestrator 700 initiates another computation also involving the entity, then a component of the orchestrator (e.g., an orchestration worker) may assign the second computation to the same host as the earlier computation based on the orchestrator's knowledge of the mapping of entity to host. The second computation may then re-use data cached at the host for the second computation, such as by re-using some of the input data or using some of the output data from the earlier computation. By using cache-ware assignment of computations in this manner, the orchestrator 700 may achieve savings in network bandwidth and memory usage.

Computation requests for particular entities may be buffered or queued by the orchestrator and then batched into a single workflow step. In one embodiment, requests for computation may be associated with a single entity (e.g., customer account) or a small number of entities. For example, a customer service representative may generate a request to calculate or recalculate a bill for a particular customer's usage of computing resources in a provider network. Such a request may be held by the orchestrator 700 until a sufficient number of requests have been received for the same category of computation or until a timeout is reached. The computation may then be orchestrated for all of the accumulated entities. By using a periodic scheduling approach to computations in this manner, the orchestrator 700 may achieve savings in usage of computational resources, memory, and network bandwidth.

Figure 15B:
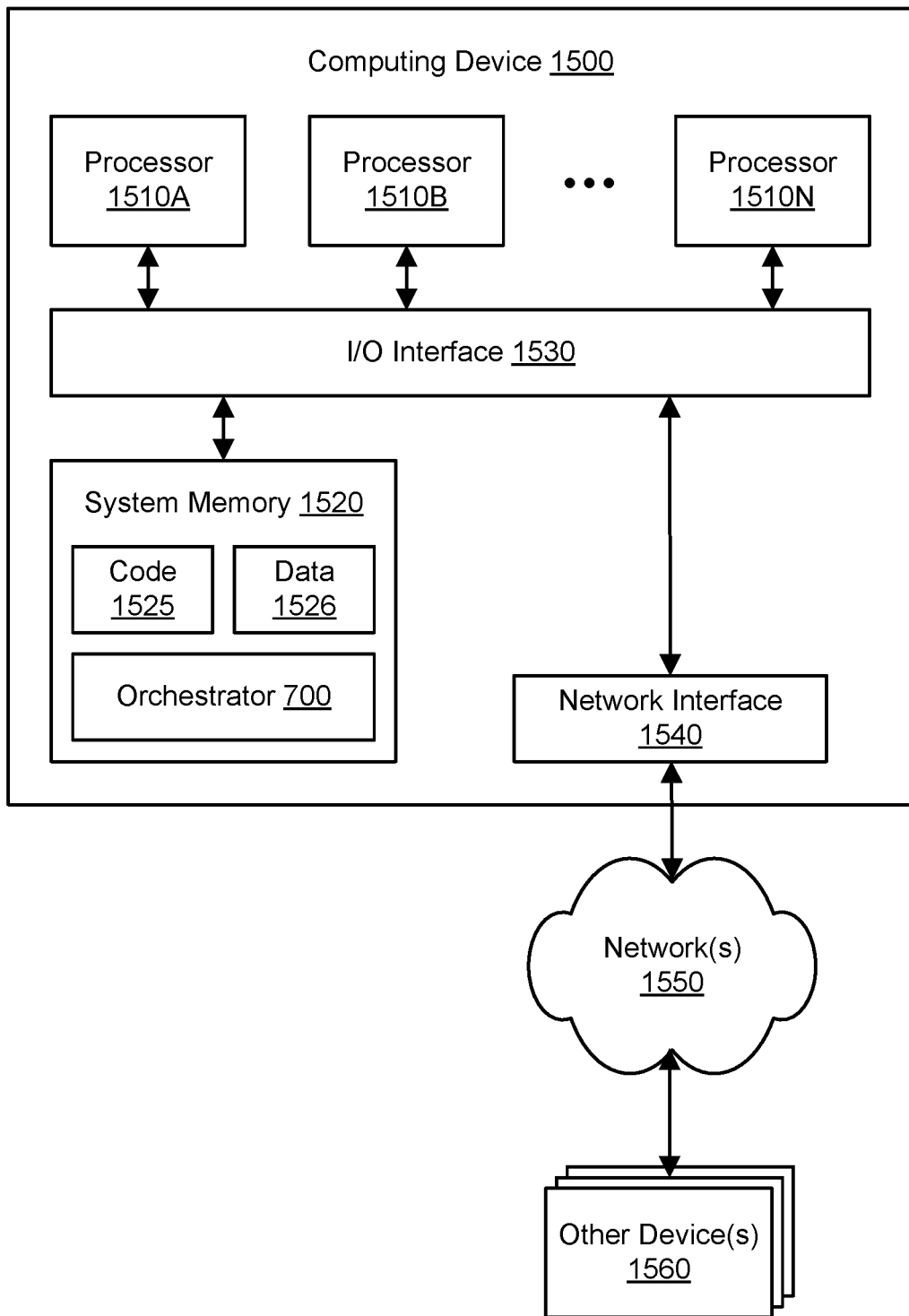

Aspects of the orchestrator 700 (including the orchestration workers 750A-750N and hosts 780A-780Z) may be implemented using any suitable number and configuration of computing devices, any of which may be implemented by the example computing device 1500 illustrated in FIG. 15B. The computing devices may be located in any suitable number of data centers or geographical locations. In various embodiments, at least some of the functionality of the orchestrator 700 may be provided by the same computing device or by different computing devices. If any of the components of the orchestrator 700 are implemented using different computing devices, then the components and their respective computing devices may be communicatively coupled, e.g., via one or more networks. Each of the components of the orchestrator 700 may represent any combination of software and hardware usable to perform their respective functions, as discussed as follows. Operations implemented by the orchestrator 700 may be performed automatically, e.g., without a need for user initiation or user intervention after an initial configuration stage, and programmatically, e.g., by execution of program instructions on at least one computing device. It is contemplated that the orchestrator 700 may include additional components not shown, fewer components than shown, or different combinations, configurations, or quantities of the components shown.

The orchestrator 700 may be implemented in a service-oriented system in which multiple services collaborate according to a service-oriented architecture. In such an environment, the orchestrator service 710 may offer its functionality as service to multiple clients. A service may be implemented using a plurality of different instances that are distributed throughout one or more networks, and each instance may offer access to the functionality of the corresponding service to various clients. It is contemplated that any suitable number and configuration of clients may interact with the orchestrator service 710. To enable clients to invoke its functionality, the orchestrator service 710 may expose any suitable interface(s), such as one or more APIs or other programmatic interfaces and/or graphical user interfaces (GUIs). In one embodiment, the functionality of the orchestrator service 710 may be offered to clients in exchange for fees. Clients of the orchestrator service 710 may represent other users, groups, or entities associated with the same entity that offers the repository manager 100, or the clients may be external users, groups, or entities.

The orchestrator 700 and its constituent elements may be coupled to other components and services via one or more networks. In various embodiments, the network(s) may encompass any suitable combination of networking hardware and protocols necessary to establish network-based communications between the orchestrator 700 and other components or services. For example, the network(s) may generally encompass the various telecommunications networks and service providers that collectively implement the Internet. The network(s) may also include private networks such as local area networks (LANs) or wide area networks (WANs) as well as public or private wireless networks. For example, both the orchestrator service 710 and orchestration workers 750A-750N or hosts 780A-780Z may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the orchestrator service 710 and the Internet as well as between the Internet and the orchestration workers 750A-750N or hosts 780A-780Z. It is noted that in some embodiments, the orchestrator service 710 may communicate with the orchestration workers 750A-750N or hosts 780A-780Z using a private network rather than the public Internet. In some embodiments, aspects of the orchestrator service 710 and orchestration workers 750A-750N or hosts 780A-780Z may be implemented using computing resources of a provider network.

Figure 8:
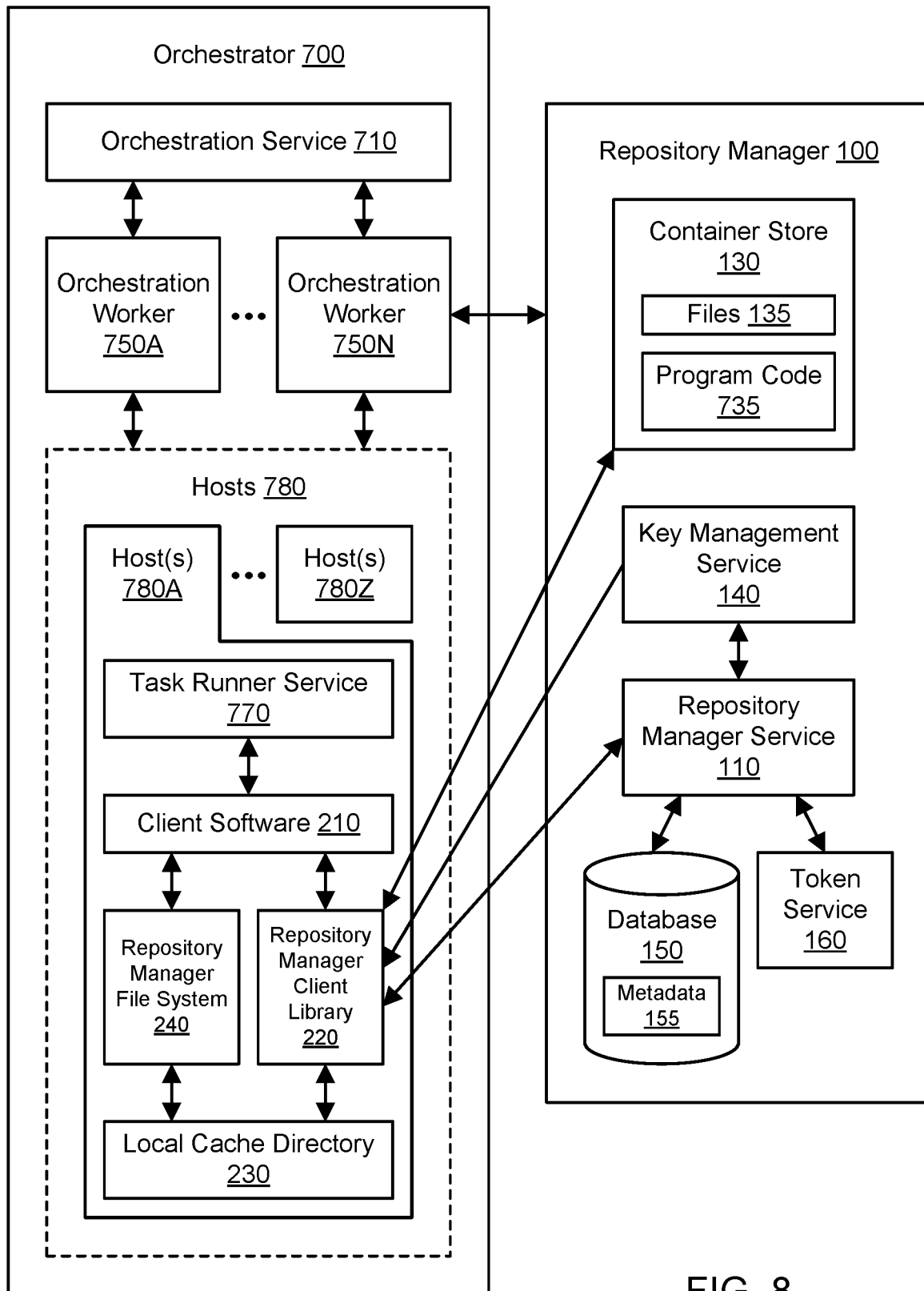
FIG. 8 illustrates further aspects of the example system environment for orchestration of computations using a remote repository, including task runner hosts that access the repository manager, according to some embodiments.

FIG. 8 illustrates further aspects of the example system environment for orchestration of computations using a remote repository, including task runner hosts that access the repository manager, according to some embodiments. As discussed above with respect to FIG. 1 through FIG. 6, the repository manager 100 may be accessible by multiple clients, including the hosts 780A-780Z, to add data items to a repository or to obtain copies of data items and program code for local use. At a host such as host 780A, local copies of directories and files may be obtained from the repository manager 100, stored in a local cache 230, and accessed on the host via a local filesystem 240. The host 780A may include a client library 220 that interacts with components of the repository manager 100, as described above. The program code 735 for a computation may also be obtained by a host 780A from the repository manager 100 and may be stored locally on the host; the client software 210 may represent such program code. In one embodiment, a computation may be replayed on the same host or a different host by obtaining the archival recordings of the inputs and program code from the repository manager 100.

Figure 9:
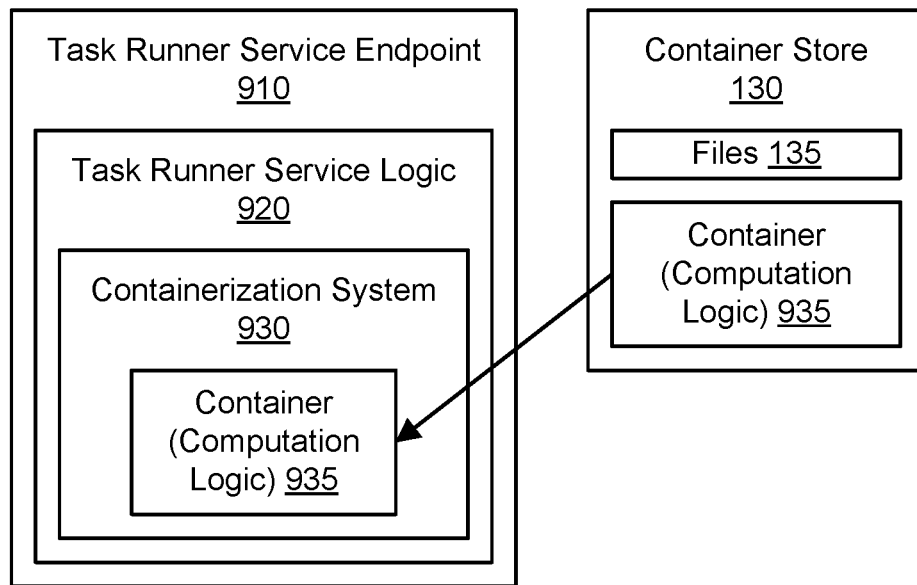
FIG. 9 illustrates further aspects of the example system environment for orchestration of computations using a remote repository, including a task runner service that executes containerized logic to perform computations, according to some embodiments.

FIG. 9 illustrates further aspects of the example system environment for orchestration of computations using a remote repository, including a task runner service that executes containerized logic to perform computations, according to some embodiments. The program code for a computation may be implemented using a container 935 that is stored using the repository manager 100. The container 935 may include or implement particular computation logic. For example, the container 935 may implement business logic to generate a bill for a client account based on usage records for that client and a pricing model for the client. As another example, the container 935 may implement logic to perform simulations or other scientific computations. As yet another example, the container 935 may implement logic to perform machine learning tasks, e.g., to train a machine learning model or apply the machine learning model to predict future events. The container 935 may be implemented in accordance with a containerization system such as the Docker platform that performs virtualization on the operating system level. In one embodiment, the container 935 may include an image of an operating system executable on one of the hosts 780A-780Z along with specific logic for a computation.

In one embodiment, the task runner service 770 may be implemented using different instances, also referred to as service endpoints. One such service endpoint 910 is illustrated in FIG. 9. The task runner service endpoint 910 may include task runner service logic 920 that represents the functionality of the task runner service 770, e.g., to manage task execution. The task runner service endpoint 910 may also include a containerization system 930 such as the Docker system. The containerization system 930 may permit the endpoint 910 to execute a container or other image 935. The container or image 935 may include an operating system and specific computation logic and may be acquired from the container store 130 and stored locally. The containerization system 930 may represent a virtualized computing environment in which an instance of an operating system may be run to execute the particular business logic associated with a computation. The container store 130 may store such containers for an indefinite length of time in order to ensure the reproducibility of computations.

Figure 10:
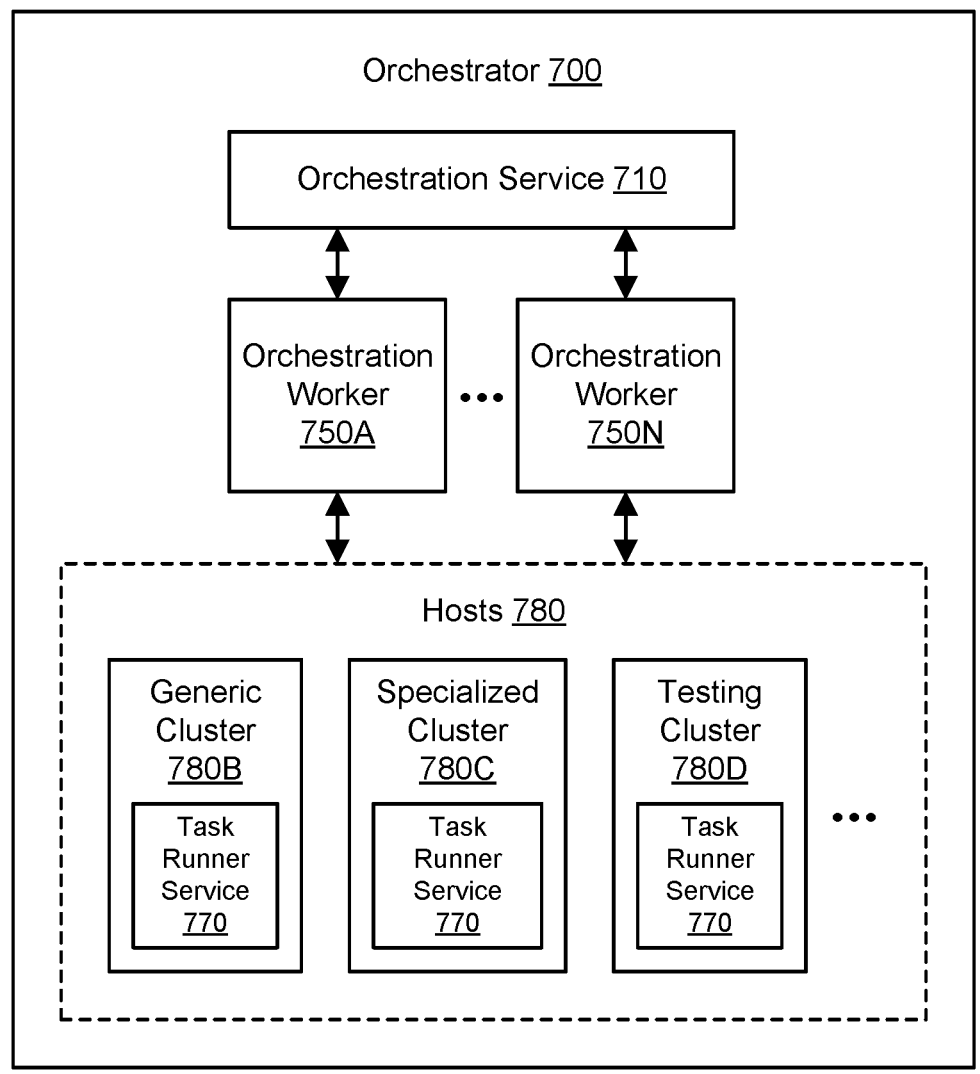
FIG. 10 illustrates further aspects of the example system environment for orchestration of computations using a remote repository, including the use of clusters having different capabilities by the task runner service, according to some embodiments.

FIG. 10 illustrates further aspects of the example system environment for orchestration of computations using a remote repository, including the use of clusters having different capabilities by the task runner service, according to some embodiments. The orchestrator 700 may select hosts for a particular computation according to the capabilities of the hosts and the needs of the computation. Using the techniques described herein, computations and workflows may be orchestrated to make efficient use of computational resources, memory resources, and network resources while permitting archiving, replay, and auditing. The orchestrator 700 may scale the number of concurrently used hosts up or down. The number of hosts and/or type of hosts used for a step may vary based on the computational resources required for the step. For example, the number of hosts may tend to increase as the number of keys (or entities) increases for a computation. As another example, computations associated with domains such as scientific computing, simulation, and machine learning may be assigned to specialized hosts having different hardware capabilities and/or configurations than typical hosts.

As shown in the example of FIG. 10, the orchestrator 700 may employ hosts or computing resources having different capabilities and/or configurations of hardware and/or software. For example, the task runner service 770 may be implemented on a generic cluster 780B that is capable of performing basic computations, e.g., to compute customer bills for usage of resource in a provider network. As another example, the task runner service 770 may be implemented on a specialized cluster 780C that is capable of performing specialized operations, e.g., for domains such as scientific computing, simulation, and machine learning. As another example, the task runner service 770 may be implemented on a testing cluster 780D that is capable of performing tasks in an isolated testing environment. Each of the clusters 780B-780D may include a particular number of nodes having a particular hardware configuration. The task runner service 770 may offer a variety of computing resources (including clusters and individual hosts) with different processor capabilities, different memory capabilities or architectures, different network capabilities, and so on. In one embodiment, a responsible orchestration worker may select a particular cluster or other computing resource for a particular computation based on the needs of that computation. In one embodiment, an orchestration worker may distribute a workload across different types of clusters or hosts.

Figure 11:
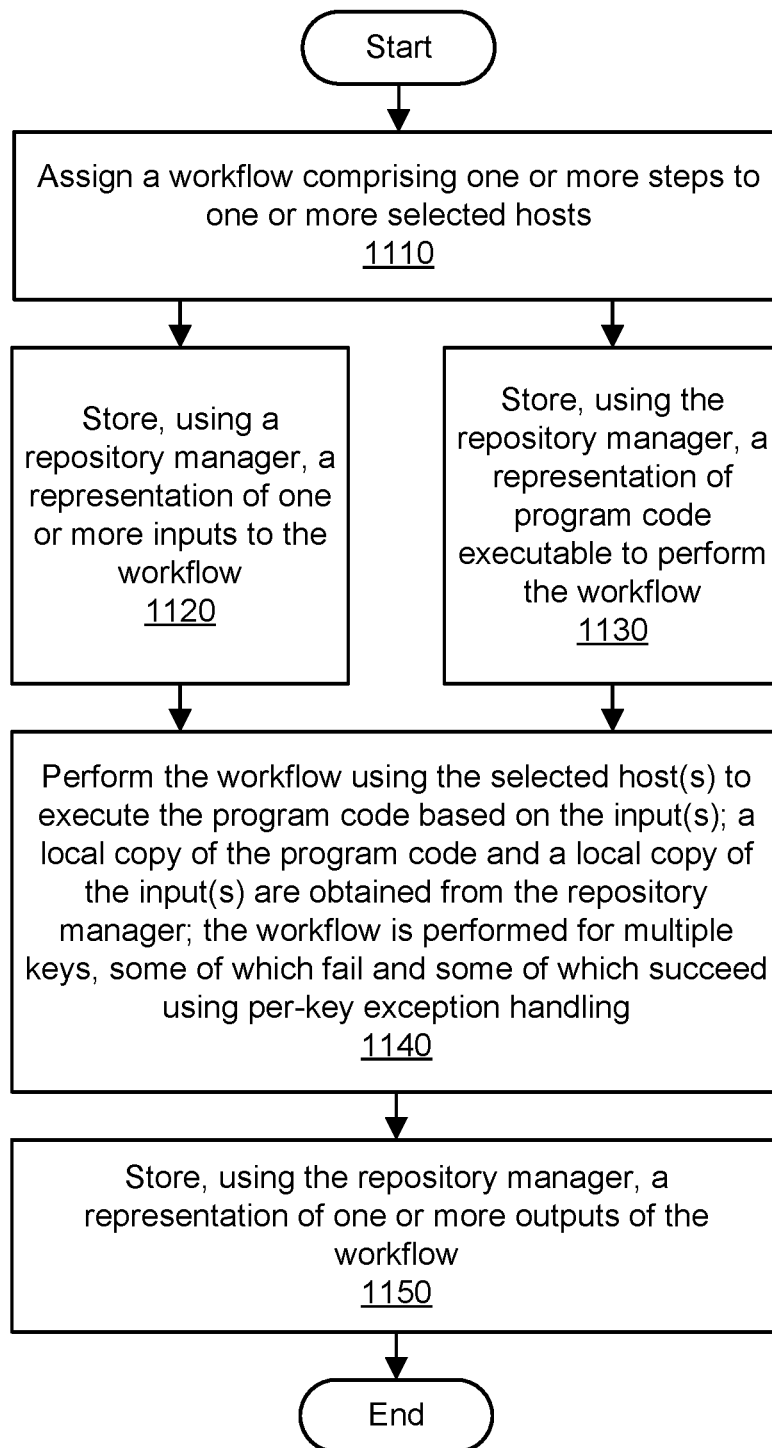
FIG. 11 is a flowchart illustrating a method for orchestration of computations using a remote repository, according to some embodiments.

FIG. 11 is a flowchart illustrating a method for orchestration of computations using a remote repository, according to some embodiments. As shown in 1110, a workflow comprising one or more steps may be assigned to one or more hosts. The one or more steps may represent one or more computations, and a computation may be associated with a set of keys (e.g., accounts or entities) for which the computation should be attempted. The one or more hosts may be selected from a set of available hosts that differ in their capabilities, configurations, and/or costs. In one embodiment, the host(s) may be selected by an orchestrator based on the amount of input (e.g., the number of keys), the type of computation (e.g., simple business logic vs. scientific computation), and so on.

As shown in 1120, a representation of one or more inputs to the workflow (e.g., to one or more steps of the workflow) may be stored using a repository manager. The representation may include any data object or data structure that captures the one or more inputs, e.g., field names, data types, and/or values. The inputs may be provided to the repository manager by one or more external entities or by one or more clients of the repository manager. For example, ingestion clients may receive a stream of usage records from a multi-tenant provider network and add those records to one or more centralized repositories. The repository manager may maintain data in an additive manner, such that existing files in a repository may be deemed immutable but that new files (including new versions of old files) may be added.

As shown in 1130, a representation of program code executable to perform the workflow (e.g., one or more steps of the workflow) may be stored using the repository manager. The representation may include any data object or data structure that captures program code or logic. The program code may be part of a container or image, e.g., a Docker container. The container or image may also include an operating system image to be run on a virtual compute instance. The program code may be built by one or more developers and provided to the repository manager via a development environment. In one embodiment, the program code may represent one or more functions or tasks to be performed by a serverless computation service.

As shown in 1140, the workflow (e.g., one or more steps) may be performed using the selected host(s). The host(s) may execute a local copy of the program code obtained from the repository manager. The program code may be executed based (at least in part) on a local copy of the one or more inputs obtained from the repository manager. The local copy of the input(s) may be stored in a local cache directory and accessed by the local computation via a local filesystem associated with the repository manager. The workflow may be performed with respect to a plurality of keys. Individual keys may be scheduled for individual hosts. The keys may be distributed across multiple hosts or may instead be processed by a single host. In one embodiment, per-key or per-entity exception handling may be used for the workflow. A computation may fail for one or more keys, but the same computation may then be attempted and may succeed for one or more other keys. By contrast, using traditional approaches to big data jobs, a single failure for a single key may cause the entire computation to be terminated across all keys. In one embodiment, a large number of keys may be partitioned across a fleet of worker hosts using smaller micro-batches of keys. Using micro-batching, the computation may fail more quickly for individual keys, thus permitting faster error recovery.

The workflow may produce one or more outputs. For example, a machine learning workflow may generate a trained model, or a simulation may generate predictions about real-world behavior. As shown in 1150, a representation of the one or more outputs may be recorded by an orchestrator and stored using the repository manager. The representation may include any data object or data structure that captures the one or more outputs, e.g., field names, data types, and/or values. The archived input(s) and program code may be used to replay the computation, and the archived output(s) may be used for comparison to any replays.

Parameter Variations for Computations Using a Remote Repository

Figure 12:
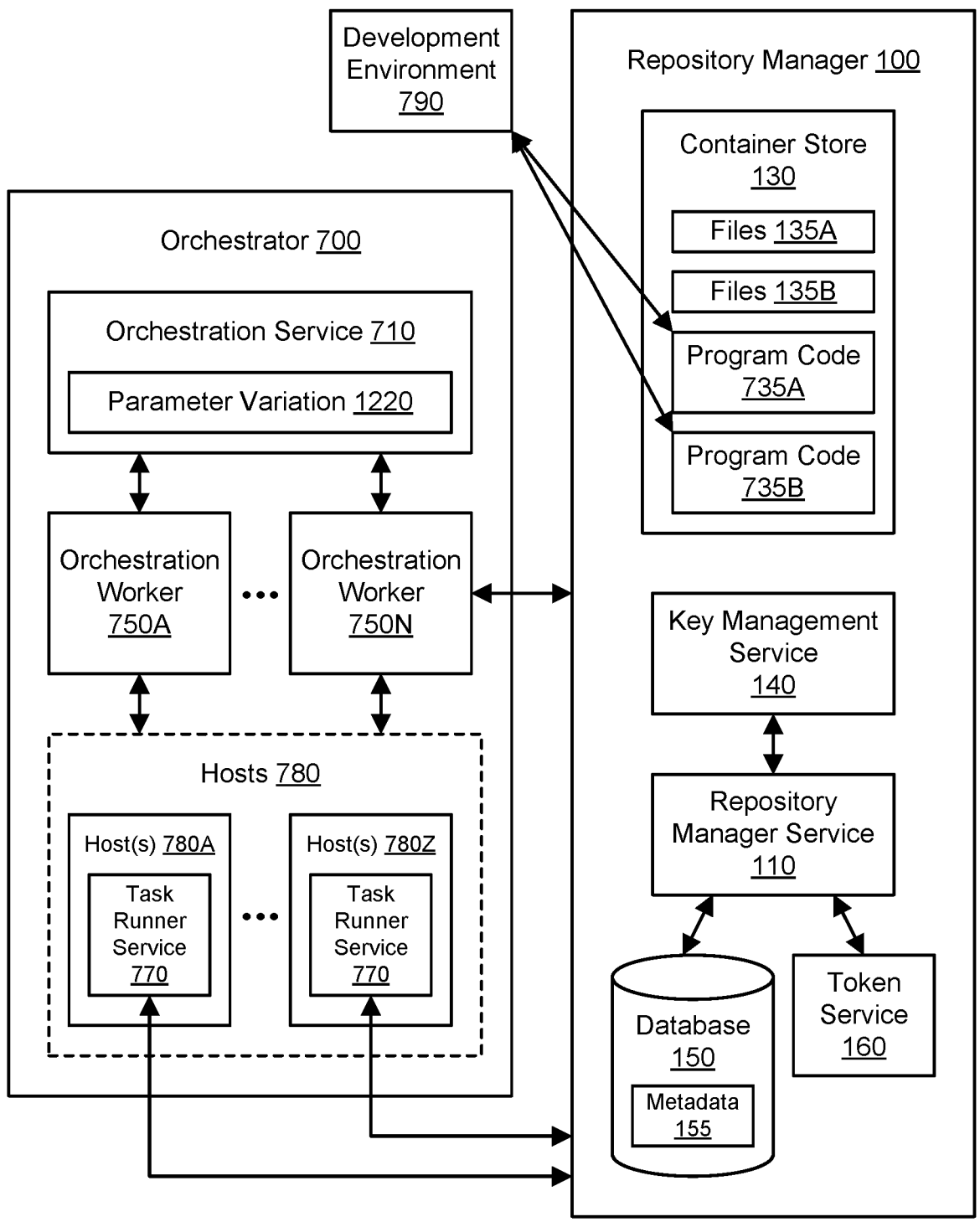
FIG. 12 illustrates an example system environment for parameter variations for computations using a remote repository, according to some embodiments.

FIG. 12 illustrates an example system environment for parameter variations for computations using a remote repository, according to some embodiments. As discussed above, a computation orchestrator 700 may manages computation across a fleet of hosts 780A-780Z. The orchestrator may record the inputs to a computation, the program code for a computation, and the outputs of a computation using a remote repository manager 100. In one embodiment, the orchestrator 700 may manage computations having some similarities but also having parameter variations. For example, the orchestrator may manage a first computation using one set of inputs and a second computation using the same program code but a different set of inputs. As another example, the orchestrator may manage a first computation using one set of program code and a second computation using the same inputs but a different set of program code.

Using a component for parameter variation 1220, the orchestrator 700 may run similar computations with different parameters concurrently or serially. The orchestrator 700 may determine outcomes of the computations and may permit selection of one set of parameters based on those outcomes. The orchestrator may vary a set of parameters for a computation based on the outcome of a prior computation having a particular set of parameters. Using parameter variation 1220, the orchestrator 700 may perform AB testing of software to select an optimal build. Using parameter variation 1220, the orchestrator 700 may perform "what if" simulations with different inputs, e.g., different usage patterns or different pricing plans for determining bills for a customer of a multi-tenant provider network. Using parameter variation 1220, the orchestrator 700 may test a software build with different sets of input data in a parallel manner. Parameter variation 1220 may permit the orchestrator 700 to run simulations, machine learning tasks, financial analysis tasks, and so on, and to select the optimal set of parameters across many variations.

Figure 13:
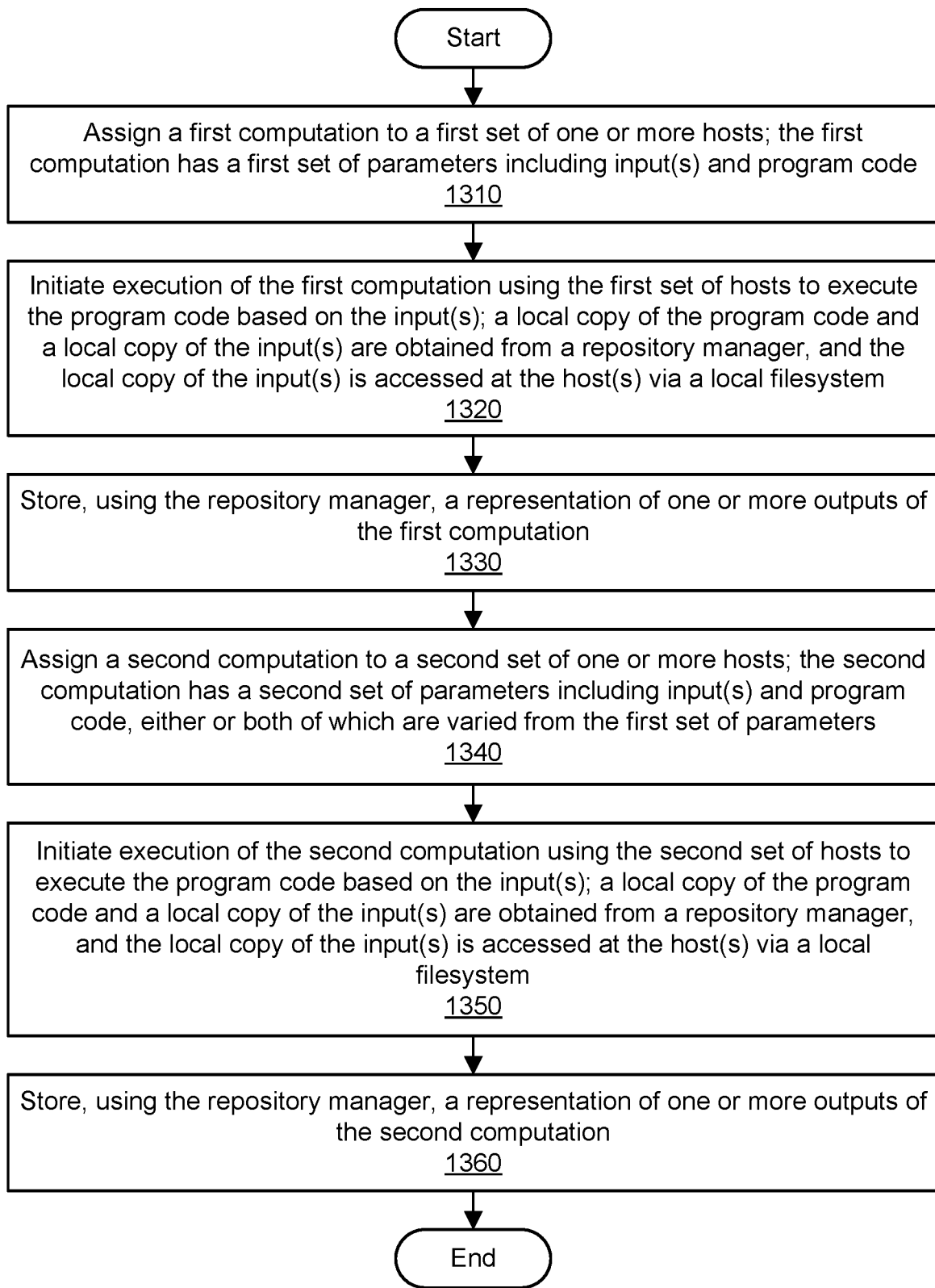
FIG. 13 is a flowchart illustrating a method for parameter variations for computations using a remote repository, including serial execution of parameter variations, according to some embodiments.

FIG. 13 is a flowchart illustrating a method for parameter variations for computations using a remote repository, including serial execution of parameter variations, according to some embodiments. As shown in 1310, a first computation may be assigned to a first set of one or more hosts. The first computation may represent a step in a workflow. The first computation may be associated with a first set of parameters. The first set of parameters may include a first set of one or more inputs and a first set of program code for the computation. The first set of input(s) and the first set of program code may be stored using a remote repository manager. The program code may be part of a container or image, e.g., a Docker container. The container or image may also include an operating system image to be run on a virtual compute instance. The program code may be built by one or more developers and provided to the repository manager via a development environment. The first set of host(s) may include one or more clusters, one or more virtual compute instances, or one or more other computational resources. The first computation may be associated with a set of entities (e.g., accounts or primary keys) for which the computation should be attempted. The one or more hosts may be selected from a set of available hosts that differ in their capabilities, configurations, and/or costs. In one embodiment, the host(s) may be selected by an orchestrator based on the amount of input (e.g., the number of entities), the type of computation (e.g., simple business logic vs. scientific computation), and so on.

As shown in 1320, execution of the first computation may be initiated using the first set of host(s). The execution may use the first set of program code and the first set of inputs. In one embodiment, a local copy of the program code may be transferred to the first set of host(s) from a storage service using a credential sent to the host(s) by a repository manager service. In one embodiment, a local copy of the input(s) may be transferred to the first set of host(s) from the storage service using the credential, stored in a local cache, and accessed by the computation via a local filesystem associated with the repository manager. Individual keys may be scheduled for individual hosts. The keys may be distributed across multiple hosts or may instead be processed by a single host. In one embodiment, per-key or per-entity exception handling may be used for the workflow. A computation may fail for one or more keys, but the same computation may then be attempted and may succeed for one or more other keys. By contrast, using traditional approaches to big data jobs, a single failure for a single key may cause the entire computation to be terminated across all keys.

The computation may produce one or more outputs. For example, a machine learning workflow may generate a trained model, a simulation may generate predictions about real-world behavior, or a financial calculation may generate a bill for a customer. As shown in 1330, a representation of the one or more outputs may be stored using the repository manager, e.g., by the host(s) adding the output(s) to the storage service using the supplied credential. The representation may include any data object or data structure that captures the one or more outputs, e.g., field names, data types, and/or values.

As shown in 1340, a second computation may be assigned to a second set of one or more hosts. The second computation may also represent a step in a workflow but may represent a variation of the first computation. The second computation may be associated with a second set of parameters that differ (at least in part) from the first set of parameters. For example, the second set of parameters may include a second set of one or more inputs rather than the first set of one or more inputs. As another example, the second set of parameters may include a second set of program code rather than the first set of program code. The second set of program code may represent an updated build of the first set of program code. In one embodiment, the second set of parameters may be determined based (at least in part) on an outcome of the first computation, e.g., to tweak the computation. The set of input(s) and the set of program code for the second computation may be stored using a remote repository manager. The second set of host(s) may include one or more clusters, one or more virtual compute instances, or one or more other computational resources. The second set of host(s) may include none of the first set of host(s), some of the first set of host(s), or all of the first set of host(s). The second computation may be associated with a set of entities (e.g., accounts or primary keys) for which the computation should be attempted; these entities may be the same or may different with respect to the first computation. The second set of one or more hosts may be selected from a set of available hosts that differ in their capabilities, configurations, and/or costs. In one embodiment, the host(s) may be selected by an orchestrator based on the amount of input (e.g., the number of entities), the type of computation (e.g., simple business logic vs. scientific computation), and so on.

As shown in 1350, execution of the second computation may be initiated using the second set of host(s). The execution may use the set of program code and the set of inputs associated with the second set of parameters. In one embodiment, the same inputs as the first computation may be used with different program code. For example, a new build of the software may be tested using the second computation to determine whether the outputs are the same as the first or to compare the performance of the two builds. In one embodiment, different inputs may be used with the same program code. For example, different usage records may be used with the same pricing model to generate an alternative bill, or the same usage records may be used with a different pricing model to generate an alternative bill. In one embodiment, a local copy of the program code may be transferred to the second set of host(s) from a storage service using a credential sent to the host(s) by a repository manager service. In one embodiment, a local copy of the input(s) may be transferred to the second set of host(s) from the storage service using the credential, stored in a local cache, and accessed by the computation via a local filesystem associated with the repository manager. As with the first computation, individual keys may be scheduled for individual hosts. The keys may be distributed across multiple hosts or may instead be processed by a single host. In one embodiment, per-key or per-entity exception handling may be used for the workflow. A computation may fail for one or more keys, but the same computation may then be attempted and may succeed for one or more other keys.

The second computation may produce one or more outputs. For example, a machine learning workflow may generate a trained model, a simulation may generate predictions about real-world behavior, or a financial calculation may generate a bill for a customer. As shown in 1360, a representation of the one or more outputs may be stored using the repository manager, e.g., by the host(s) adding the output(s) to the storage service using the supplied credential. The representation may include any data object or data structure that captures the one or more outputs, e.g., field names, data types, and/or values. In one embodiment, the second output(s) may be compared against the first output(s), e.g., to determine whether the two computations produced the same or different outputs. In one embodiment, outcomes such as performance metrics for the two computations may be compared, e.g., to determine which of the two computations had a superior execution time or otherwise made better use of resources.

Figure 14:
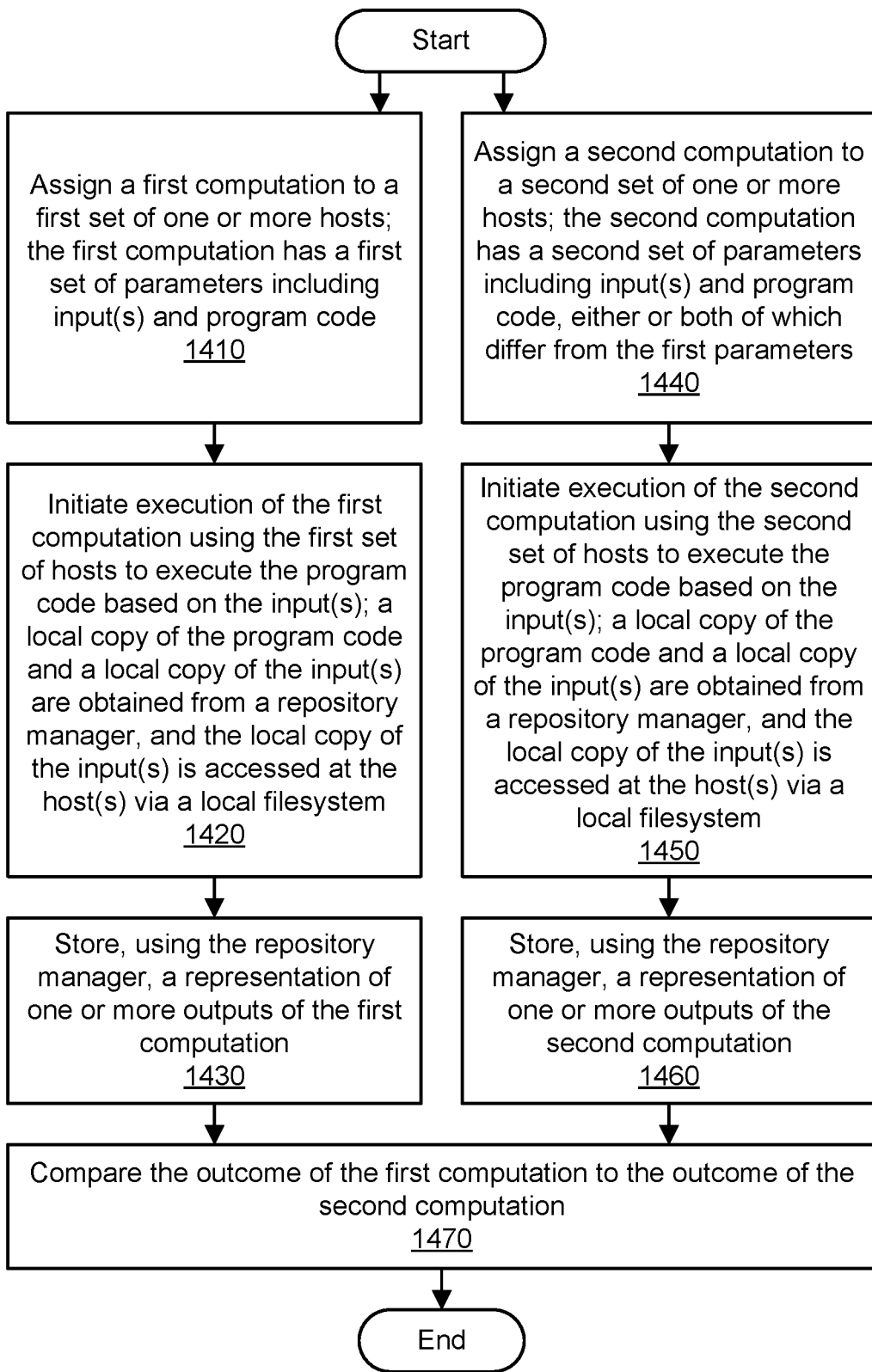
FIG. 14 is a flowchart illustrating a method for parameter variations for computations using a remote repository, including parallel execution of parameter variations, according to some embodiments.

FIG. 14 is a flowchart illustrating a method for parameter variations for computations using a remote repository, including parallel execution of parameter variations, according to some embodiments. As shown in 1410, a first computation may be assigned to a first set of one or more hosts. The first computation may represent a step in a workflow. The first computation may be associated with a first set of parameters. The first set of parameters may include a first set of one or more inputs and a first set of program code for the computation. The first set of input(s) and the first set of program code may be stored using a remote repository manager. The program code may be part of a container or image, e.g., a Docker container. The container or image may also include an operating system image to be run on a virtual compute instance. The program code may be built by one or more developers and provided to the repository manager via a development environment. The first set of host(s) may include one or more clusters, one or more virtual compute instances, or one or more other computational resources. The first computation may be associated with a set of entities (e.g., accounts or primary keys) for which the computation should be attempted. The one or more hosts may be selected from a set of available hosts that differ in their capabilities, configurations, and/or costs. In one embodiment, the host(s) may be selected by an orchestrator based on the amount of input (e.g., the number of entities), the type of computation (e.g., simple business logic vs. scientific computation), and so on.

As shown in 1420, execution of the first computation may be initiated using the first set of host(s). The execution may use the first set of program code and the first set of inputs. In one embodiment, a local copy of the program code may be transferred to the first set of host(s) from a storage service using a credential sent to the host(s) by a repository manager service. In one embodiment, a local copy of the input(s) may be transferred to the first set of host(s) from the storage service using the credential, stored in a local cache, and accessed by the computation via a local filesystem associated with the repository manager. Individual keys may be scheduled for individual hosts. The keys may be distributed across multiple hosts or may instead be processed by a single host. In one embodiment, per-key or per-entity exception handling may be used for the workflow. A computation may fail for one or more keys, but the same computation may then be attempted and may succeed for one or more other keys. By contrast, using traditional approaches to big data jobs, a single failure for a single key may cause the entire computation to be terminated across all keys.

The computation may produce one or more outputs. For example, a machine learning workflow may generate a trained model, a simulation may generate predictions about real-world behavior, or a financial calculation may generate a bill for a customer. As shown in 1430, a representation of the one or more outputs may be stored using the repository manager, e.g., by the host(s) adding the output(s) to the storage service using the supplied credential. The representation may include any data object or data structure that captures the one or more outputs, e.g., field names, data types, and/or values.

A second computation may be performed concurrently with the first computation. As shown in 1440, the second computation may be assigned to a second set of one or more hosts. The second computation may also represent a step in a workflow but may represent a variation of the first computation. The second computation may be associated with a second set of parameters that differ (at least in part) from the first set of parameters. For example, the second set of parameters may include a second set of one or more inputs rather than the first set of one or more inputs. As another example, the second set of parameters may include a second set of program code rather than the first set of program code. The second set of program code may represent an updated build of the first set of program code. The set of input(s) and the set of program code for the second computation may be stored using a remote repository manager. The second set of host(s) may include one or more clusters, one or more virtual compute instances, or one or more other computational resources. The second set of host(s) may include none of the first set of host(s), some of the first set of host(s), or all of the first set of host(s). The second computation may be associated with a set of entities (e.g., accounts or primary keys) for which the computation should be attempted; these entities may be the same or may different with respect to the first computation. The second set of one or more hosts may be selected from a set of available hosts that differ in their capabilities, configurations, and/or costs. In one embodiment, the host(s) may be selected by an orchestrator based on the amount of input (e.g., the number of entities), the type of computation (e.g., simple business logic vs. scientific computation), and so on.

As shown in 1450, execution of the second computation may be initiated using the second set of host(s). The execution may use the set of program code and the set of inputs associated with the second set of parameters. In one embodiment, the same inputs as the first computation may be used with different program code. For example, a new build of the software may be tested using the second computation to determine whether the outputs are the same as the first or to compare the performance of the two builds. In one embodiment, different inputs may be used with the same program code. For example, different usage records may be used with the same pricing model to generate an alternative bill, or the same usage records may be used with a different pricing model to generate an alternative bill. In one embodiment, a local copy of the program code may be transferred to the second set of host(s) from a storage service using a credential sent to the host(s) by a repository manager service. In one embodiment, a local copy of the input(s) may be transferred to the second set of host(s) from the storage service using the credential, stored in a local cache, and accessed by the computation via a local filesystem associated with the repository manager. As with the first computation, individual keys may be scheduled for individual hosts. The keys may be distributed across multiple hosts or may instead be processed by a single host. In one embodiment, per-key or per-entity exception handling may be used for the workflow. A computation may fail for one or more keys, but the same computation may then be attempted and may succeed for one or more other keys.

The second computation may produce one or more outputs. For example, a machine learning workflow may generate a trained model, a simulation may generate predictions about real-world behavior, or a financial calculation may generate a bill for a customer. As shown in 1460, a representation of the one or more outputs may be stored using the repository manager, e.g., by the host(s) adding the output(s) to the storage service using the supplied credential. The representation may include any data object or data structure that captures the one or more outputs, e.g., field names, data types, and/or values. In one embodiment, other outcomes such as performance metrics may also be recorded and archived for the two computations.

As shown in 1470, an outcome of the first computation may be compared against an outcome of the first computation. In one embodiment, the second output(s) may be compared against the first output(s), e.g., to determine whether the two computations produced the same or different outputs. In one embodiment, outcomes such as performance metrics for the two computations may be compared, e.g., to determine which of the two computations had a superior execution time or otherwise made better use of resources. In one embodiment, either the first set of parameters or the second set of parameters may be selected based (at least in part) on the comparison. For example, the software build with a superior runtime may be selected. As another example, the pricing model input that generated a higher or lower bill may be selected. As yet another example, machine learning computations or scientific computations (e.g., simulations) may be run concurrently with different parameter variations, and the set of parameters associated with the optimal computation may be selected.

Illustrative Computer System

In at least some embodiments, a computer system that implements a portion or all of one or more of the technologies described herein may include a computer system that includes or is configured to access one or more computer-readable media. FIG. 15A and FIG. 15B illustrate such a computing device 1500. In the illustrated embodiment, computing device 1500 includes one or more processors 1510A-1510N coupled to a system memory 1520 via an input/output (I/O) interface 1530. Computing device 1500 further includes a network interface 1540 coupled to I/O interface 1530.

In various embodiments, computing device 1500 may be a uniprocessor system including one processor or a multiprocessor system including several processors 1510A-1510N (e.g., two, four, eight, or another suitable number). Processors 1510A-1510N may include any suitable processors capable of executing instructions. For example, in various embodiments, processors 1510A-1510N may be processors implementing any of a variety of instruction set architectures (ISAs), such as the x86, PowerPC, SPARC, or MIPS ISAs, or any other suitable ISA. In multiprocessor systems, each of processors 1510A-1510N may commonly, but not necessarily, implement the same ISA.

System memory 1520 may be configured to store program instructions and data accessible by processor(s) 1510A-1510N. In various embodiments, system memory 1520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1520 as code (i.e., program instructions) 1525 and data 1526. As shown in FIG. 15A, system memory 1520 stores program code and data that implement aspects of the repository manager service 110 discussed above. As shown in FIG. 15B, system memory 1520 stores program code and data that implement aspects of the orchestrator 700 discussed above.

In one embodiment, I/O interface 1530 may be configured to coordinate I/O traffic between processors 1510A-1510N, system memory 1520, and any peripheral devices in the device, including network interface 1540 or other peripheral interfaces. In some embodiments, I/O interface 1530 may perform any necessary protocol, timing or other data transformations to convert data signals from one component (e.g., system memory 1520) into a format suitable for use by another component (e.g., processors 1510A-1510N). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. Also, in some embodiments some or all of the functionality of I/O interface 1530, such as an interface to system memory 1520, may be incorporated directly into processors 1510A-1510N.

Network interface 1540 may be configured to allow data to be exchanged between computing device 1500 and other devices 1560 attached to a network or networks 1550. In various embodiments, network interface 1540 may support communication via any suitable wired or wireless general data networks, such as types of Ethernet network, for example. Additionally, network interface 1540 may support communication via telecommunications/telephony networks such as analog voice networks or digital fiber communications networks, via storage area networks such as Fibre Channel SANs, or via any other suitable type of network and/or protocol.

In some embodiments, system memory 1520 may be one embodiment of at least one computer-readable (i.e., computer-accessible) medium configured to store program instructions and data as described above for implementing embodiments of the corresponding methods and apparatus. For example, system memory 1520 may store program code and data associated with the network security evaluator 100. In some embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 1500 via I/O interface 1530. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 1500 as system memory 1520 or another type of memory. Further, a computer-readable medium may include transmission media or signals such as electrical, electromagnetic, or digital signals, conveyed via a communication medium such as a network and/or a wireless link, such as may be implemented via network interface 1540. The described functionality may be implemented using one or more non-transitory computer-readable storage media storing program instructions that are executed on or across one or more processors. Portions or all of multiple computing devices such as that illustrated in FIG. 15A and FIG. 15B may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

The foregoing may be better understood in view of the following clauses:

Clause 1. A system, comprising:
  one or more computing devices configured to implement a repository manager, wherein the repository manager is configured to:
  store one or more files of a repository using a storage service;
  send, to a client library at a client device, a credential permitting access to the one or more files in the storage service, wherein the one or more files are obtained by the client device from the storage service using the credential, wherein local copies of the one or more files are stored in a cache memory at the client device and accessible via a local filesystem mounted at the client device, and wherein one or more new files associated with the repository are generated at the client device; and
  add the one or more new files to the repository, wherein the one or more new files are added to the storage service by the client device using the credential.

Clause 2. The system as recited in clause 1, wherein the one or more new files are detected at the client device based at least in part on isolation of the one or more new files from the local copies of the one or more files in the cache memory.

Clause 3. The system as recited in clause 1, wherein the credential comprises a pre-signed uniform resource locator (URL).

Clause 4. The system as recited in clause 1, wherein the credential is cached at the client device and used a plurality of times by the client device to upload a plurality of files to the storage service.

Clause 5. A computer-implemented method performed by one or more computing devices, comprising:
  sending, from a storage service to a client device, one or more files of a repository maintained by a repository manager using the storage service, wherein the one or more files are obtained by the client device from the storage service using a credential sent by the repository manager to the client device, wherein local copies of the one or more files are accessible via a local filesystem mounted at the client device, and wherein one or more new files associated with the repository are generated at the client device; and
  obtaining the one or more new files at the storage service from the client device, wherein the one or more new files are added by the client device to the storage service using the credential, and wherein the one or more new files are added to the repository.

Clause 6. The method as recited in clause 5, wherein the one or more new files are detected at the client device based at least in part on isolation of the one or more new files from the local copies in a cache.

Clause 7. The method as recited in clause 5, wherein the one or more files and the one or more new files are content-addressable via respective content hashes in the repository and in a cache at the client device.

Clause 8. The method as recited in clause 5, wherein the credential comprises a temporary access token provided by a token service.

Clause 9. The method as recited in clause 5, wherein the credential comprises a pre-signed uniform resource locator (URL).

Clause 10. The method as recited in clause 5, wherein the credential is cached at the client device and used a plurality of times by the client device to upload a plurality of files to the storage service.

Clause 11. The method as recited in clause 5, wherein one or more additional files of the repository are not sent to the client device.

Clause 12. The method as recited in clause 5, wherein the repository is associated with a namespace, and wherein the one or more new files are encrypted at the client device using a master key associated with the namespace.

Clause 13. One or more non-transitory computer-readable storage media storing program instructions that, when executed on or across one or more processors, perform:
  sending, from a storage service to a client device, one or more files of a repository maintained by a repository manager using the storage service, wherein the one or more files are obtained by the client device from the storage service using a credential sent by the repository manager to the client device, wherein local copies of the one or more files are accessible via a local filesystem mounted at the client device, and wherein one or more new files associated with the repository are generated at the client device; and
  obtaining the one or more new files at the storage service from the client device, wherein the one or more new files are added by the client device to the storage service using the credential, and wherein the one or more new files are added to the repository.

Clause 14. The one or more non-transitory computer-readable storage media as recited in clause 13, wherein the one or more new files are differentiated at the client device based at least in part on isolation of the one or more new files from the local copies in the cache.

Clause 15. The one or more non-transitory computer-readable storage media as recited in clause 13, wherein the one or more files and the one or more new files are content-addressable via respective content hashes in the repository and in the cache at the client device.

Clause 16. The one or more non-transitory computer-readable storage media as recited in clause 13, wherein the credential comprises a temporary access token provided by a token service.

Clause 17. The one or more non-transitory computer-readable storage media as recited in clause 13, wherein the credential comprises a pre-signed uniform resource locator (URL).

Clause 18. The one or more non-transitory computer-readable storage media as recited in clause 13, wherein the credential is cached at the client device and used a plurality of times by the client device to upload a plurality of files to the storage service.

Clause 19. The one or more non-transitory computer-readable storage media as recited in clause 13, wherein one or more additional files of the repository are not sent to the client device.

Clause 20. The one or more non-transitory computer-readable storage media as recited in clause 13, wherein the repository is associated with a namespace, and wherein the one or more new files are encrypted at the client device using a master key associated with the namespace.

Clause 21. A system, comprising:
means for sending one or more files of a repository from a storage service to a client device, wherein the one or more files are requested by the client device from the storage service using a credential sent by a repository manager to the client device, wherein local copies of the one or more files are accessible via a local filesystem mounted at the client device, and wherein one or more new files associated with the repository are generated at the client device; and
means for obtaining the one or more new files at the storage service from the client device, wherein the one or more new files are added by the client device to the storage service using the credential, and wherein the one or more new files are added to the repository.

Clause 22. The system as recited in clause 21, wherein the one or more new files are detected at the client device based at least in part on isolation of the one or more new files from the local copies in a cache.

Clause 23. The system as recited in clause 21, wherein the one or more files and the one or more new files are content-addressable via respective content hashes in the repository and in a cache at the client device.

Clause 24. The system as recited in clause 21, wherein the credential comprises a temporary access token provided by a token service.

Clause 25. The system as recited in clause 21, wherein the credential comprises a pre-signed uniform resource locator (URL).

Additionally, the foregoing may be better understood in view of the following clauses:

Clause 26. A system, comprising:
a repository manager;
a plurality of hosts; and
a computation orchestrator implemented using one or more computing devices, wherein the computation orchestrator is configured to:
assign a workflow comprising one or more steps to one or more selected hosts of the plurality of hosts;
record and store, using the repository manager, a representation of one or more inputs to the workflow;
record and store, using the repository manager, a representation of program code executable to perform the workflow, wherein a local copy of the one or more inputs is obtained from the repository manager and accessible by the workflow via a local filesystem mounted at the one or more selected hosts, wherein the workflow is performed by the one or more selected hosts using the program code and the local copy of the one or more inputs, wherein the workflow is initiated with respect to a plurality of keys, wherein the workflow succeeds for a second portion of the keys after one or more steps of the workflow fail for a first portion of the keys;
record and store, using the repository manager, a representation of one or more outputs of the workflow.

Clause 27. The system as recited in clause 26, wherein the workflow is performed on the one or more hosts for the keys, and wherein the workflow is performed on an additional one or more hosts for an additional plurality of keys.

Clause 28. The method as recited in clause 26, wherein the computation orchestrator is configured to:
detect a failure of the workflow with respect to the first portion of the keys on the one or more hosts; and
after the failure is detected, initiate the workflow for the second portion of the keys using the one or more hosts.

Clause 29. The method as recited in clause 26, wherein the computation orchestrator is configured to:
store a mapping between a first subset of the keys and the one or more hosts; and
assign an additional computation associated with the first subset of the keys to the one or more hosts, wherein the additional computation uses data cached at the one or more hosts.

Clause 30. A computer-implemented method performed by one or more computing devices, comprising:
storing, using a repository manager, a representation of one or more inputs to a computation, wherein the computation is assigned to one or more hosts of a plurality of hosts, and wherein a local copy of the one or more inputs is stored on the one or more hosts;
storing, using the repository manager, a representation of program code executable to perform the computation;
initiating the computation on the one or more hosts using the program code and the local copy of the one or more inputs, wherein the computation is initiated with respect to a plurality of keys, wherein the computation fails for a first portion of the keys, and wherein the computation succeeds for a second portion of the keys after the computation has failed for at least some of the first portion of the keys; and
storing, using the repository manager, a representation of one or more outputs of the computation.

Clause 31. The method as recited in clause 30, further comprising:
performing the computation again on an additional one or more hosts using the program code copied from the repository and the one or more inputs copied from the repository.

Clause 32. The method as recited in clause 30, wherein the computation is performed using the one or more hosts for the plurality of keys, and wherein the computation is performed using an additional one or more hosts for an additional plurality of keys.

Clause 33. The method as recited in clause 30, wherein a quantity of the one or more hosts is determined using a computation orchestrator based at least in part on a quantity of the keys.

Clause 34. The method as recited in clause 30, further comprising:
    detecting, using a computation orchestrator, a failure of the computation with respect to the first portion of the keys on the one or more hosts; and
    after the failure is detected, initiating the computation for the second portion of the keys using the one or more hosts.

Clause 35. The method as recited in clause 30, further comprising:
    storing, using a computation orchestrator, a mapping between a first subset of the keys and the one or more hosts; and
    assigning an additional computation associated with the first subset of the keys to the one or more hosts, wherein the additional computation uses data cached at the one or more hosts.

Clause 36. The method as recited in clause 30, wherein the computation represents a step in a workflow, wherein the program code associated with the step is implemented using a container, wherein one or more additional computations performed by one or more additional hosts represent one or more additional steps in the workflow, and wherein the one or more additional computations are implemented using one or more additional containers.

Clause 37. The method as recited in clause 30, wherein a plurality of computation requests associated with the plurality of keys are received by a computation orchestrator and placed in a queue, and wherein the computation is initiated for the plurality of keys by the computation orchestrator.

Clause 38. One or more non-transitory computer-readable storage media storing program instructions that, when executed on or across one or more processors, perform:
    storing, using a repository manager, a representation of one or more inputs to a computation, wherein the computation represents at least one step in a workflow, wherein the computation is assigned to one or more hosts of a plurality of hosts, and wherein a local copy of the one or more inputs is stored on the one or more hosts;
    storing, using the repository manager, a representation of program code executable to perform the computation;
    initiating the computation on the one or more hosts using the program code and the local copy of the one or more inputs, wherein the computation is initiated with respect to a plurality of entities, wherein the computation fails for a first portion of the entities, and wherein the computation succeeds for a second portion of the entities after the computation has failed for at least some of the first portion of the entities; and
    storing, using the repository manager, a representation of one or more outputs of the computation.

Clause 39. The one or more non-transitory computer-readable storage media as recited in clause 38, wherein the program instructions are further computer-executable to perform:
    performing the computation again on an additional one or more hosts using the program code copied from the repository and the one or more inputs copied from the repository.

Clause 40. The one or more non-transitory computer-readable storage media as recited in clause 38, herein the computation is performed on the one or more hosts for the plurality of entities, and wherein the computation is performed on an additional one or more hosts for a second plurality of entities.

Clause 41. The one or more non-transitory computer-readable storage media as recited in clause 38, wherein a quantity of the one or more hosts is determined using a computation orchestrator based at least in part on a quantity of the entities.

Clause 42. The one or more non-transitory computer-readable storage media as recited in clause 38, wherein the program instructions are further computer-executable to perform:
    detecting, using a computation orchestrator, a failure of the computation with respect to the first portion of the entities on the one or more hosts; and
    after the failure is detected, initiating the computation for the second portion of the entities using the one or more hosts.

Clause 43. The one or more non-transitory computer-readable storage media as recited in clause 38, wherein the program instructions are further computer-executable to perform:
    storing, using a computation orchestrator, a mapping between a first subset of the entities and the one or more hosts; and
    assigning an additional computation associated with the first subset of the entities to the one or more hosts, wherein the additional computation uses data cached at the one or more hosts.

Clause 44. The one or more non-transitory computer-readable storage media as recited in clause 38, wherein the program code associated with the at least one step is implemented using a container, wherein one or more additional computations performed by one or more additional hosts represent one or more additional steps in the workflow, and wherein the one or more additional computations are implemented using one or more additional containers.

Clause 45. The one or more non-transitory computer-readable storage media as recited in clause 38, wherein a plurality of computation requests associated with the plurality of entities are received by a computation orchestrator and placed in a queue, and wherein the computation is initiated for the plurality of entities by the computation orchestrator.

Clause 46. A system, comprising:
    means for storing a representation of one or more inputs to a computation, wherein the computation is assigned to one or more hosts of a plurality of hosts, and wherein a local copy of the one or more inputs is stored on the one or more hosts;
    means for storing a representation of program code executable to perform the computation;
    means for initiating the computation on the one or more hosts using the program code and the local copy of the one or more inputs, wherein the computation is initiated with respect to a plurality of keys, wherein the computation fails for a first portion of the keys, and wherein the computation succeeds for a second portion of the keys after the computation fails for at least some of the first portion of the keys; and
    means for storing a representation of one or more outputs of the computation.

Clause 47. The system as recited in clause 46, further comprising:
    means for performing the computation again using the program code copied from the repository and the one or more inputs copied from the repository.

Clause 48. The system as recited in clause 46, wherein a quantity of the one or more hosts is determined using a computation orchestrator based at least in part on a quantity of the keys.

Clause 49. The system as recited in clause 46, further comprising:
  means for detecting a failure of the computation with respect to the first portion of the keys on the one or more hosts; and
  means for initiating the computation for the second portion of the keys after the failure is detected.

Clause 50. The system as recited in clause 46, further comprising:
  means for storing a mapping between a first subset of the keys and the one or more hosts; and
  means for assigning an additional computation associated with the first subset of the keys to the one or more hosts, wherein the additional computation uses data cached at the one or more hosts.

Furthermore, the foregoing may be better understood in view of the following clauses:

Clause 51. A system, comprising:
  a repository manager;
  a plurality of hosts; and
  a computation orchestrator implemented using one or more computing devices, wherein the computation orchestrator is configured to:
  assign a first computation to a first set of one or more hosts of the plurality of hosts, wherein the first computation is associated with a first set of parameters including a first set of one or more inputs and a first set of program code; assign a second computation to a second set of one or more hosts of the plurality of hosts, wherein the second computation is associated with a second set of parameters that differs at least in part from the first set of one or more inputs, from the first set of program code, or from the first set of one or more inputs and the first set of program code;
  initiate execution of the first computation using the first set of one or more hosts and using the first set of parameters, wherein a local copy of the first set of one or more inputs and a local copy of the first set of program code are obtained from a storage service using one or more credentials supplied by the repository manager, and wherein the first computation is executed by the first set of one or more hosts using the local copy of the first set of program code and the local copy of the first set of one or more inputs;
  initiate execution of the second computation using the second set of one or more hosts and using the second set of parameters;
  store, using the repository manager, a representation of one or more outputs of the first computation and a representation of one or more outputs of the second computation.

Clause 52. The system as recited in clause 51, wherein the second computation is executed by the second set of one or more hosts using an additional local copy of the first set of program code and a local copy of a second set of one or more inputs, or wherein the second computation is executed by the second set of one or more hosts using a local copy of a second set of program code and an additional local copy of the first set of one or more inputs.

Clause 53. The system as recited in clause 51, wherein the first computation and the second computation are run in parallel, and wherein the computation orchestrator is configured to:
  perform a comparison of the outcome of the first computation to an outcome of the second computation; and
  select the first set of parameters or the second set of parameters responsive to the comparison.

Clause 54. The system as recited in clause 51, wherein the execution of the second computation is initiated after the execution of the first computation is complete, and wherein the computation orchestrator is configured to:
  vary the second set of parameters from the first set of parameters responsive to an outcome of the first computation.

Clause 55. A computer-implemented method performed by one or more computing devices, comprising:
  assigning a first computation to a first set of one or more hosts, wherein the first computation is associated with a first set of parameters including a first set of one or more inputs and a first set of program code;
  assigning a second computation to a second set of one or more hosts, wherein the second computation is associated with a second set of parameters that differs at least in part from the first set of parameters;
  initiating execution of the first computation using the first set of one or more hosts and using the first set of parameters, wherein a local copy of the first set of one or more inputs and a local copy of the first set of program code are obtained from a storage service using one or more credentials supplied by a repository manager, and wherein the first computation is executed by the first set of one or more hosts using the local copy of the first set of program code and the local copy of the first set of one or more inputs; and
  initiating execution of the second computation using the second set of one or more hosts and using the second set of parameters.

Clause 56. The method as recited in clause 55, wherein the second computation is executed by the second set of one or more hosts using an additional local copy of the first set of program code and a local copy of a second set of one or more inputs, wherein the additional local copy of the first set of program code and the local copy of the second set of one or more inputs are obtained from the repository manager, and wherein the local copy of the second set of one or more inputs is accessible by the second computation via a local filesystem mounted at the second set of one or more hosts.

Clause 57. The method as recited in clause 55, wherein the second computation is executed by the second set of one or more hosts using a local copy of a second set of program code and an additional local copy of the first set of one or more inputs, wherein the local copy of the second set of program code and the additional local copy of the first set of one or more inputs are obtained from the repository manager, and wherein the additional local copy of the first set of one or more inputs is accessible by the second computation via a local filesystem mounted at the second set of one or more hosts.

Clause 58. The method as recited in clause 55, further comprising:
  storing, using the repository manager, a representation of one or more outputs of the first computation and a representation of one or more outputs of the second computation.

Clause 59. The method as recited in clause 55, wherein the first computation and the second computation are run in parallel, and wherein the method further comprises:
  performing a comparison of the outcome of the first computation to an outcome of the second computation; and selecting the first set of parameters or the second set of parameters responsive to the comparison.

Clause 60. The method as recited in clause 55, wherein the execution of the second computation is initiated after the execution of the first computation is complete, and wherein the method further comprises:
varying the second set of parameters from the first set of parameters responsive to an outcome of the first computation.

Clause 61. The method as recited in clause 55, wherein the first computation and the second computation include one or more simulations.

Clause 62. The method as recited in clause 55, wherein the first computation and the second computation include one or more machine learning tasks.

Clause 63. One or more non-transitory computer-readable storage media storing program instructions that, when executed on or across one or more processors, perform:
assigning a first computation to a first set of one or more hosts, wherein the first computation is associated with a first set of parameters including a first set of one or more inputs and a first set of program code;
assigning a second computation to a second set of one or more hosts, wherein the second computation is associated with a second set of parameters that differs at least in part from the first set of parameters;
initiating execution of the first computation using the first set of one or more hosts and using the first set of parameters, wherein a local copy of the first set of one or more inputs and a local copy of the first set of program code are obtained from a repository manager, wherein the first computation is executed by the first set of one or more hosts using the local copy of the first set of program code and the local copy of the first set of one or more inputs, wherein the first computation is initiated with respect to a plurality of keys, and wherein the first computation succeeds for a second portion of the keys after the first computation has failed for a first portion of the keys; and
initiating execution of the second computation using the second set of one or more hosts and using the second set of parameters.

Clause 64. The one or more non-transitory computer-readable storage media as recited in clause 63, wherein the second computation is executed by the second set of one or more hosts using an additional local copy of the first set of program code and a local copy of a second set of one or more inputs, wherein the additional local copy of the first set of program code and the local copy of the second set of one or more inputs are obtained from the repository manager, and wherein the local copy of the second set of one or more inputs is accessible by the second computation via a local filesystem mounted at the second set of one or more hosts.

Clause 65. The one or more non-transitory computer-readable storage media as recited in clause 63, wherein the second computation is executed by the second set of one or more hosts using a local copy of a second set of program code and an additional local copy of the first set of one or more inputs, wherein the local copy of the second set of program code and the additional local copy of the first set of one or more inputs are obtained from the repository manager, and wherein the additional local copy of the first set of one or more inputs is accessible by the second computation via a local filesystem mounted at the second set of one or more hosts.

Clause 66. The one or more non-transitory computer-readable storage media as recited in clause 63, wherein the program instructions are further computer-executable to perform:
storing, using the repository manager, a representation of one or more outputs of the first computation and a representation of one or more outputs of the second computation.

Clause 67. The one or more non-transitory computer-readable storage media as recited in clause 63, wherein the first computation and the second computation are run in parallel, and wherein the program instructions are further computer-executable to perform:
performing a comparison of the outcome of the first computation to an outcome of the second computation; and
selecting the first set of parameters or the second set of parameters responsive to the comparison.

Clause 68. The one or more non-transitory computer-readable storage media as recited in clause 63, wherein the execution of the second computation is initiated after the execution of the first computation is complete, and wherein the program instructions are further computer-executable to perform:
varying the second set of parameters from the first set of parameters responsive to an outcome of the first computation.

Clause 69. The one or more non-transitory computer-readable storage media as recited in clause 63, wherein the first computation and the second computation include one or more simulations.

Clause 70. The one or more non-transitory computer-readable storage media as recited in clause 63, wherein the first computation and the second computation include one or more machine learning tasks.

Clause 71. A system, comprising:
means for assigning a first computation to a first set of one or more hosts, wherein the first computation is associated with a first set of parameters including a first set of one or more inputs and a first set of program code;
means for assigning a second computation to a second set of one or more hosts, wherein the second computation is associated with a second set of parameters that differs at least in part from the first set of parameters;
means for initiating execution of the first computation based at least in part on the first set of one or more hosts and using the first set of parameters, wherein a copy of the first set of one or more inputs and a copy of the first set of program code are obtained from a storage service using one or more credentials supplied by a repository manager, and wherein the first computation is executed by the first set of one or more hosts using the copy of the first set of program code and the copy of the first set of one or more inputs; and
means for initiating execution of the second computation based at least in part on the second set of one or more hosts and using the second set of parameters.

Clause 72. The system as recited in clause 71, wherein the second computation is executed by the second set of one or more hosts using an additional copy of the first set of program code and a copy of a second set of one or more inputs, wherein the additional copy of the first set of program code and the copy of the second set of one or more inputs are obtained from a repository manager, and wherein the copy of the second set of one or more inputs is accessible by the second computation via a local filesystem mounted at the second set of one or more hosts.

Clause 73. The system as recited in clause 71, wherein the second computation is executed by the second set of one or more hosts using a copy of a second set of program code and an additional copy of the first set of one or more inputs, wherein the copy of the second set of program code and the additional copy of the first set of one or more inputs are obtained from a repository manager, and wherein the additional copy of the first set of one or more inputs is accessible by the second computation via a local filesystem mounted at the second set of one or more hosts.

Clause 74. The system as recited in clause 71, further comprising:
means for storing a representation of one or more outputs of the first computation and a representation of one or more outputs of the second computation.

Clause 75. The system as recited in clause 71, wherein the first computation and the second computation are run in parallel, and wherein the method further comprises:
means for performing a comparison of the outcome of the first computation to an outcome of the second computation; and
means for selecting the first set of parameters or the second set of parameters responsive to the comparison.

What is claimed is:

1. A system, comprising:
a repository manager;
a plurality of hosts; and
a computation orchestrator implemented using one or more computing devices, wherein the computation orchestrator is configured to:
assign a first computation to a first set of one or more hosts of the plurality of hosts, wherein the first computation is associated with a first set of parameters including a first set of one or more inputs and a first set of program code;
assign a second computation to a second set of one or more hosts of the plurality of hosts, wherein the second set of one or more hosts is different than the first set of one or more hosts, and wherein the second computation is associated with a second set of parameters that either comprises the first set of program code and a second set of one or more inputs that differs at least in part from the first set of one or more inputs, or comprises the first set of one or more inputs and a second set of program code that differs at least in part from the first set of program code;
initiate execution of the first computation using the first set of one or more hosts and using the first set of parameters, wherein a local copy of the first set of one or more inputs and a local copy of the first set of program code are obtained by the first set of one or more hosts from a storage service using one or more credentials supplied by the repository manager, and wherein the first computation is executed by the first set of one or more hosts using the local copy of the first set of program code and the local copy of the first set of one or more inputs;
initiate execution of the second computation using the second set of one or more hosts and using the second set of parameters;
store, using the repository manager, a representation of one or more outputs of the first computation and a representation of one or more outputs of the second computation.

2. The system as recited in claim 1, wherein the second computation is executed by the second set of one or more hosts using an additional local copy of the first set of program code and a local copy of the second set of one or more inputs, or wherein the second computation is executed by the second set of one or more hosts using a local copy of the second set of program code and an additional local copy of the first set of one or more inputs.

3. The system as recited in claim 1, wherein the first computation and the second computation are run in parallel, and wherein the computation orchestrator is configured to:
perform a comparison of the outcome of the first computation to an outcome of the second computation; and
select the first set of parameters or the second set of parameters responsive to the comparison.

4. The system as recited in claim 1, wherein the execution of the second computation is initiated after the execution of the first computation is complete, and wherein the computation orchestrator is configured to:
vary the second set of parameters from the first set of parameters responsive to an outcome of the first computation.

5. A computer-implemented method performed by one or more computing devices, comprising:
assigning a first computation to a first set of one or more hosts, wherein the first computation is associated with a first set of parameters including a first set of one or more inputs and a first set of program code;
assigning a second computation to a second set of one or more hosts, wherein the second set of one or more hosts is different than the first set of one or more hosts, and wherein the second computation is associated with a second set of parameters that either comprises the first set of program code and a second set of one or more inputs that differs at least in part from the first set of one or more inputs, or comprises the first set of one or more inputs and a second set of program code that differs at least in part from the first set of program code;
initiating execution of the first computation using the first set of one or more hosts and using the first set of parameters, wherein a local copy of the first set of one or more inputs and a local copy of the first set of program code are obtained by the first set of one or more hosts from a storage service using one or more credentials supplied by a repository manager, and wherein the first computation is executed by the first set of one or more hosts using the local copy of the first set of program code and the local copy of the first set of one or more inputs; and
initiating execution of the second computation using the second set of one or more hosts and using the second set of parameters.

6. The method as recited in claim 5, wherein the second computation is executed by the second set of one or more hosts using an additional local copy of the first set of program code and a local copy of the second set of one or more inputs, wherein the additional local copy of the first set of program code and the local copy of the second set of one or more inputs are obtained from the repository manager, and wherein the local copy of the second set of one or more inputs is accessible by the second computation via a local filesystem mounted at the second set of one or more hosts.

7. The method as recited in claim 5, wherein the second computation is executed by the second set of one or more hosts using a local copy of the second set of program code and an additional local copy of the first set of one or more inputs, wherein the local copy of the second set of program code and the additional local copy of the first set of one or more inputs are obtained from the repository manager, and wherein the additional local copy of the first set of one or more inputs is accessible by the second computation via a local filesystem mounted at the second set of one or more hosts.

8. The method as recited in claim 5, further comprising:
storing, using the repository manager, a representation of one or more outputs of the first computation and a representation of one or more outputs of the second computation.

9. The method as recited in claim 5, wherein the first computation and the second computation are run in parallel, and wherein the method further comprises:
performing a comparison of the outcome of the first computation to an outcome of the second computation; and
selecting the first set of parameters or the second set of parameters responsive to the comparison.

10. The method as recited in claim 5, wherein the execution of the second computation is initiated after the execution of the first computation is complete, and wherein the method further comprises:
varying the second set of parameters from the first set of parameters responsive to an outcome of the first computation.

11. The method as recited in claim 5, wherein the first computation and the second computation include one or more simulations.

12. The method as recited in claim 5, wherein the first computation and the second computation include one or more machine learning tasks.

13. One or more non-transitory computer-readable storage media storing program instructions that, when executed on or across one or more processors, perform:
assigning a first computation to a first set of one or more hosts, wherein the first computation is associated with a first set of parameters including a first set of one or more inputs and a first set of program code;
assigning a second computation to a second set of one or more hosts, wherein the second set of one or more hosts is different than the first set of one or more hosts, and wherein the second computation is associated with a second set of parameters that either comprises the first set of program code and a second set of one or more inputs that differs at least in part from the first set of one or more inputs, or comprises the first set of one or more inputs and a second set of program code that differs at least in part from the first set of program code;
initiating execution of the first computation using the first set of one or more hosts and using the first set of parameters, wherein a local copy of the first set of one or more inputs and a local copy of the first set of program code are obtained by the first set of one or more hosts from a repository manager, wherein the first computation is executed by the first set of one or more hosts using the local copy of the first set of program code and the local copy of the first set of one or more inputs, wherein the first computation is initiated with respect to a plurality of keys, and wherein the first computation succeeds for a second portion of the keys after the first computation has failed for a first portion of the keys; and
initiating execution of the second computation using the second set of one or more hosts and using the second set of parameters.

14. The one or more non-transitory computer-readable storage media as recited in claim 13, wherein the second computation is executed by the second set of one or more hosts using an additional local copy of the first set of program code and a local copy of the second set of one or more inputs, wherein the additional local copy of the first set of program code and the local copy of the second set of one or more inputs are obtained from the repository manager, and wherein the local copy of the second set of one or more inputs is accessible by the second computation via a local filesystem mounted at the second set of one or more hosts.

15. The one or more non-transitory computer-readable storage media as recited in claim 13, wherein the second computation is executed by the second set of one or more hosts using a local copy of the second set of program code and an additional local copy of the first set of one or more inputs, wherein the local copy of the second set of program code and the additional local copy of the first set of one or more inputs are obtained from the repository manager, and wherein the additional local copy of the first set of one or more inputs is accessible by the second computation via a local filesystem mounted at the second set of one or more hosts.

16. The one or more non-transitory computer-readable storage media as recited in claim 13, wherein the program instructions are further computer-executable to perform:
storing, using the repository manager, a representation of one or more outputs of the first computation and a representation of one or more outputs of the second computation.

17. The one or more non-transitory computer-readable storage media as recited in claim 13, wherein the first computation and the second computation are run in parallel, and wherein the program instructions are further computer-executable to perform:
performing a comparison of the outcome of the first computation to an outcome of the second computation; and
selecting the first set of parameters or the second set of parameters responsive to the comparison.

18. The one or more non-transitory computer-readable storage media as recited in claim 13, wherein the execution of the second computation is initiated after the execution of the first computation is complete, and wherein the program instructions are further computer-executable to perform:
varying the second set of parameters from the first set of parameters responsive to an outcome of the first computation.

19. The one or more non-transitory computer-readable storage media as recited in claim 13, wherein the first computation and the second computation include one or more simulations.

20. The one or more non-transitory computer-readable storage media as recited in claim 13, wherein the first computation and the second computation include one or more machine learning tasks.

21. A system, comprising:
means for assigning a first computation to a first set of one or more hosts, wherein the first computation is associated with a first set of parameters including a first set of one or more inputs and a first set of program code;
means for assigning a second computation to a second set of one or more hosts, wherein the second set of one or more hosts is different than the first set of one or more hosts, and wherein the second computation is associated with a second set of parameters that either comprises the first set of program code and a second set of one or more inputs that differs at least in part from the first set of one or more inputs, or comprises the first set of one or more inputs and a second set of program code that differs at least in part from the first set of program code;

means for initiating execution of the first computation, wherein the execution of the first computation is based at least in part on the first set of one or more hosts and uses the first set of parameters, wherein a copy of the first set of one or more inputs and a copy of the first set of program code are obtained by the first set of one or more hosts from a storage service using one or more credentials supplied by a repository manager, and wherein the first computation is executed by the first set of one or more hosts using the copy of the first set of program code and the copy of the first set of one or more inputs; and means for initiating execution of the second computation, wherein the execution of the second computation is based at least in part on the second set of one or more hosts and uses the second set of parameters.

22. The system as recited in claim 21, wherein the second computation is executed by the second set of one or more hosts using an additional copy of the first set of program code and a copy of the second set of one or more inputs, wherein the additional copy of the first set of program code and the copy of the second set of one or more inputs are obtained from a repository manager, and wherein the copy of the second set of one or more inputs is accessible by the second computation via a local filesystem mounted at the second set of one or more hosts.

23. The system as recited in claim 21, wherein the second computation is executed by the second set of one or more hosts using a copy of the second set of program code and an additional copy of the first set of one or more inputs, wherein the copy of the second set of program code and the additional copy of the first set of one or more inputs are obtained from a repository manager, and wherein the additional copy of the first set of one or more inputs is accessible by the second computation via a local filesystem mounted at the second set of one or more hosts.

24. The system as recited in claim 21, further comprising:
means for storing a representation of one or more outputs of the first computation and a representation of one or more outputs of the second computation.

25. The system as recited in claim 21, wherein the first computation and the second computation are run in parallel, and wherein the method further comprises:
means for performing a comparison of the outcome of the first computation to an outcome of the second computation; and
means for selecting the first set of parameters or the second set of parameters responsive to the comparison.

* * * * *